(12) United States Patent
Ramachandran et al.

(10) Patent No.: US 10,884,839 B2
(45) Date of Patent: *Jan. 5, 2021

(54) PROCESSING SYSTEM FOR PERFORMING PREDICTIVE ERROR RESOLUTION AND DYNAMIC SYSTEM CONFIGURATION CONTROL

(71) Applicant: Bank of America Corporation, Charlotte, NC (US)

(72) Inventors: Sriram Ramachandran, Chennai (IN); Matthew E Carroll, Charlotte, NC (US); Manu Kurian, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 160 days.

This patent is subject to a terminal disclaimer.

(21) Appl. No.: 16/002,152

(22) Filed: Jun. 7, 2018

(65) Prior Publication Data
US 2019/0377623 A1    Dec. 12, 2019

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0709* (2013.01); *G06F 11/0712* (2013.01);
(Continued)

(58) Field of Classification Search
CPC .............................. G06F 11/079; G06N 20/00
See application file for complete search history.

(56) References Cited

U.S. PATENT DOCUMENTS 6,119,103 A    9/2000  Basch et al.
6,658,393 B1  12/2003  Basch et al.
(Continued)

OTHER PUBLICATIONS

Mar. 18, 2020—(U.S.) Office Action—U.S. Appl. No. 16/002,125.
(Continued)

*Primary Examiner* — Jonathan D Gibson
(74) *Attorney, Agent, or Firm* — Banner & Witcoff, Ltd.; Michael A. Springs

(57) ABSTRACT

Aspects of the disclosure relate to dynamic system configuration control systems with improved resource allocation techniques. A computing platform may receive commands directing the computing platform to distribute relevant portions of a system configuration update. The computing platform may identify one or more virtual machine host platforms to which the system configuration update is applicable, and may direct applicable virtual machine host platforms to perform system updates based on the system configuration update. The computing platform may generate an error map identifying correlations between error codes and a respective operator for each error code. The computing platform may determine, based on the error map, an operator associated with resolution of various error codes. The computing platform may direct user devices associated with the determine operators to cause display of an operator interface, and may direct a client management computing platform to cause display of an error correction hub.

20 Claims, 18 Drawing Sheets

(51) Int. Cl.
*G06N 20/00* (2019.01)
*G06F 11/30* (2006.01)

(52) U.S. Cl.
CPC ...... *G06F 11/0751* (2013.01); *G06F 11/0769* (2013.01); *G06F 11/0775* (2013.01); *G06F 11/0787* (2013.01); *G06F 11/0793* (2013.01); *G06N 20/00* (2019.01); *G06F 11/3065* (2013.01)

(56) References Cited

U.S. PATENT DOCUMENTS

| | | | |
|---|---|---|---|
| 7,050,933 B2 | 5/2006 | Parvin et al. | |
| 7,155,423 B1 | 12/2006 | Josephson et al. | |
| 7,203,619 B2 | 4/2007 | Parvin et al. | |
| 7,286,957 B2 | 10/2007 | Parvin et al. | |
| 7,299,153 B2 | 11/2007 | Parvin et al. | |
| 7,318,000 B2 | 1/2008 | Parvin et al. | |
| 7,379,846 B1* | 5/2008 | Williams | G06F 11/079 702/183 |
| 7,437,343 B1 | 10/2008 | Josephson et al. | |
| 7,539,907 B1* | 5/2009 | Johnsen | G06F 11/008 714/26 |
| 7,752,152 B2 | 7/2010 | Paek et al. | |
| 7,765,199 B2 | 7/2010 | Dunie et al. | |
| 7,840,461 B2 | 11/2010 | Raguseo et al. | |
| 7,860,782 B2 | 12/2010 | Cash et al. | |
| 8,024,364 B2 | 9/2011 | Dunie et al. | |
| 8,032,375 B2 | 10/2011 | Chickering et al. | |
| 8,099,257 B2 | 1/2012 | Parvin et al. | |
| 8,150,547 B2 | 4/2012 | Wojdyla et al. | |
| 8,301,613 B2 | 10/2012 | Grabamik et al. | |
| 8,392,760 B2 | 3/2013 | Kandula et al. | |
| 8,489,941 B2 | 7/2013 | Anand et al. | |
| 9,009,542 B1* | 4/2015 | Marr | H04L 43/0817 714/47.3 |
| 9,069,737 B1 | 6/2015 | Kimotho et al. | |
| 9,183,074 B2 | 11/2015 | Michel et al. | |
| 9,229,800 B2 | 1/2016 | Jain et al. | |
| 9,280,535 B2 | 3/2016 | Varma et al. | |
| 9,299,031 B2 | 3/2016 | Jan et al. | |
| 9,304,796 B1* | 4/2016 | Douglas | G06F 11/0712 |
| 9,378,065 B2 | 6/2016 | Shear et al. | |
| 9,406,023 B2 | 8/2016 | Bogojeska et al. | |
| 9,665,826 B2 | 5/2017 | Jain et al. | |
| 9,734,022 B1* | 8/2017 | Dethe | G06F 11/006 |
| 9,792,160 B2 | 10/2017 | Shear et al. | |
| 9,864,673 B2 | 1/2018 | Michel et al. | |
| 9,904,579 B2 | 2/2018 | Shear et al. | |
| 9,946,631 B1 | 4/2018 | Cook et al. | |
| 9,992,229 B2 | 6/2018 | Jalan et al. | |
| 9,992,230 B1 | 6/2018 | Haverty et al. | |
| 9,992,402 B2 | 6/2018 | Suzuki | |
| 9,992,502 B2 | 6/2018 | Abbas et al. | |
| 9,992,580 B2 | 6/2018 | Cohen et al. | |
| 9,992,656 B2 | 6/2018 | Kim et al. | |
| 9,992,806 B2 | 6/2018 | Stojanovski | |
| 10,025,671 B2* | 7/2018 | Bryant | G06F 11/079 |
| 10,528,427 B1* | 1/2020 | Kataki | H04L 41/0668 |
| 2002/0174384 A1* | 11/2002 | Graichen | G06F 11/008 714/37 |
| 2011/0107148 A1* | 5/2011 | Franklin | G06F 11/0748 714/37 |
| 2014/0157058 A1* | 6/2014 | Bennah | G06F 11/34 714/38.1 |
| 2016/0196501 A1 | 7/2016 | Anand et al. | |
| 2018/0039548 A1* | 2/2018 | Bryant | G06F 11/0751 |
| 2018/0060302 A1 | 3/2018 | Liang et al. | |
| 2019/0102210 A1* | 4/2019 | Tsuru | G06F 11/006 |
| 2019/0163515 A1* | 5/2019 | Sekhar Kakaraparthi | G06F 11/0793 |
| 2019/0163594 A1* | 5/2019 | Hayden | G06F 11/3495 |
| 2019/0377622 A1* | 12/2019 | Kurian | G06F 11/0751 |
| 2019/0377623 A1* | 12/2019 | Ramachandran | G06F 11/0775 |

OTHER PUBLICATIONS

Cui, Yong et al "Wireless data center networking" IEEE Wireless Communications 18, No. 6 (2011): pp. 46-53.

Jul. 8, 2020—(U.S.) Notice of Allowance—U.S. Appl. No. 16/002,125.

\* cited by examiner

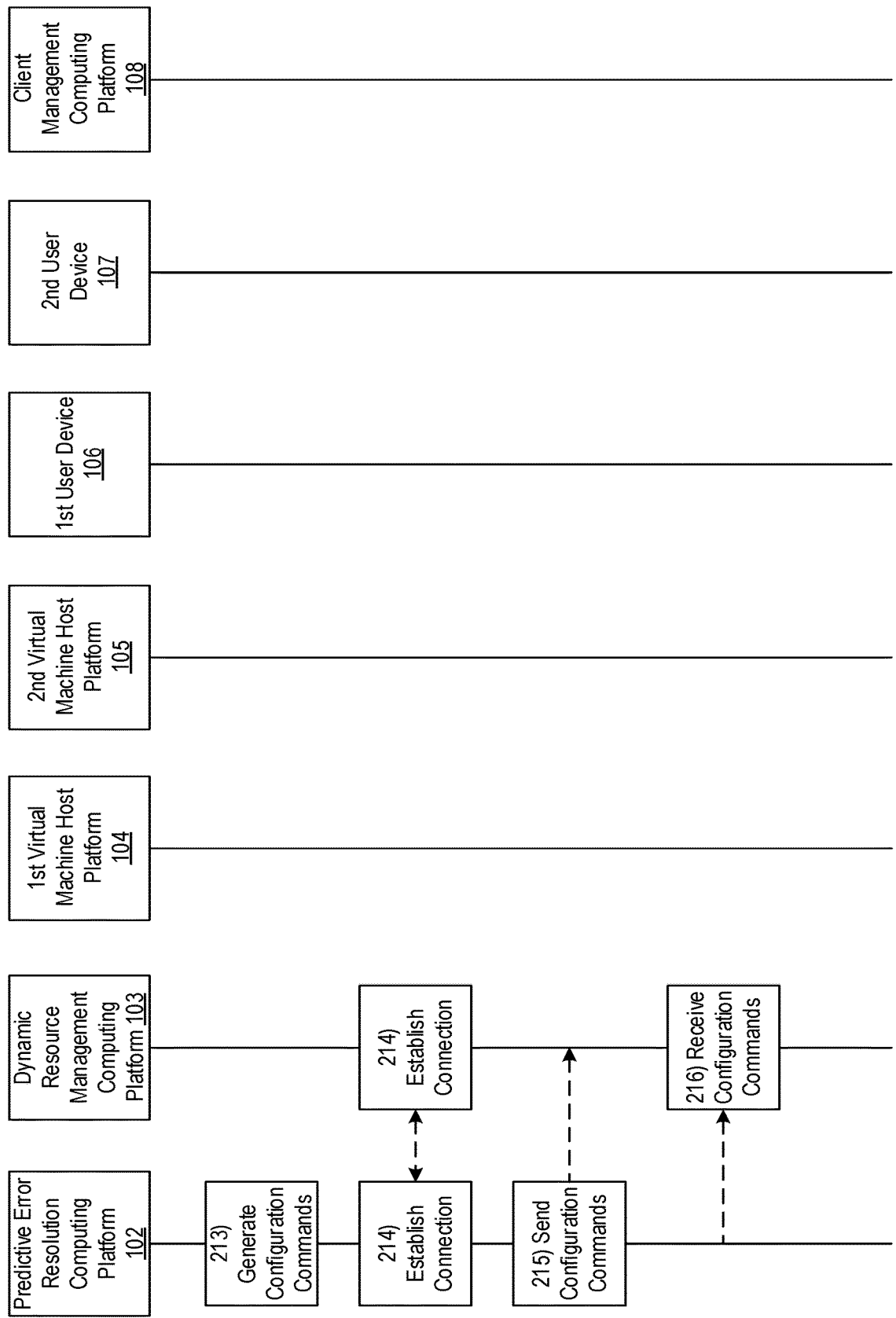

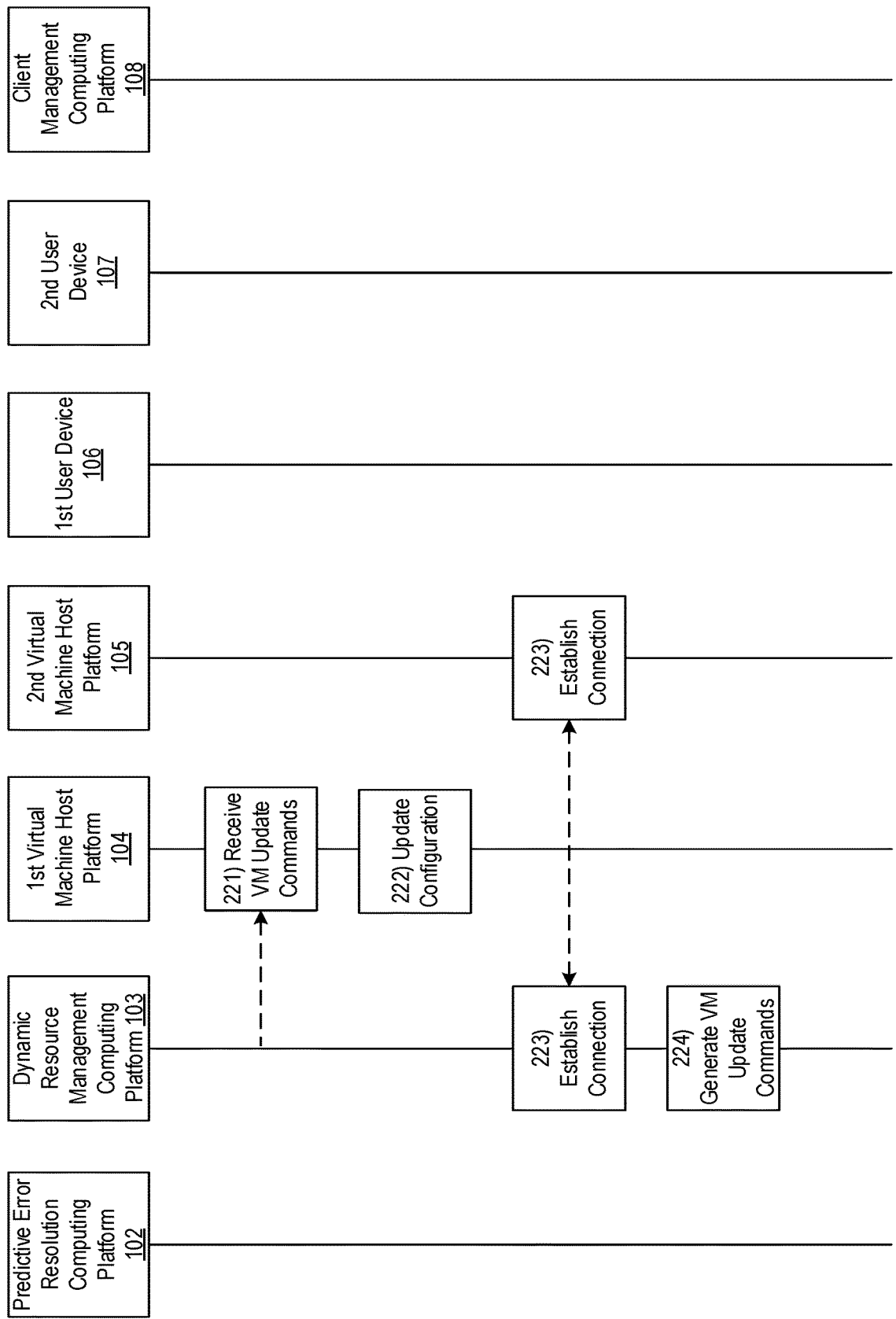

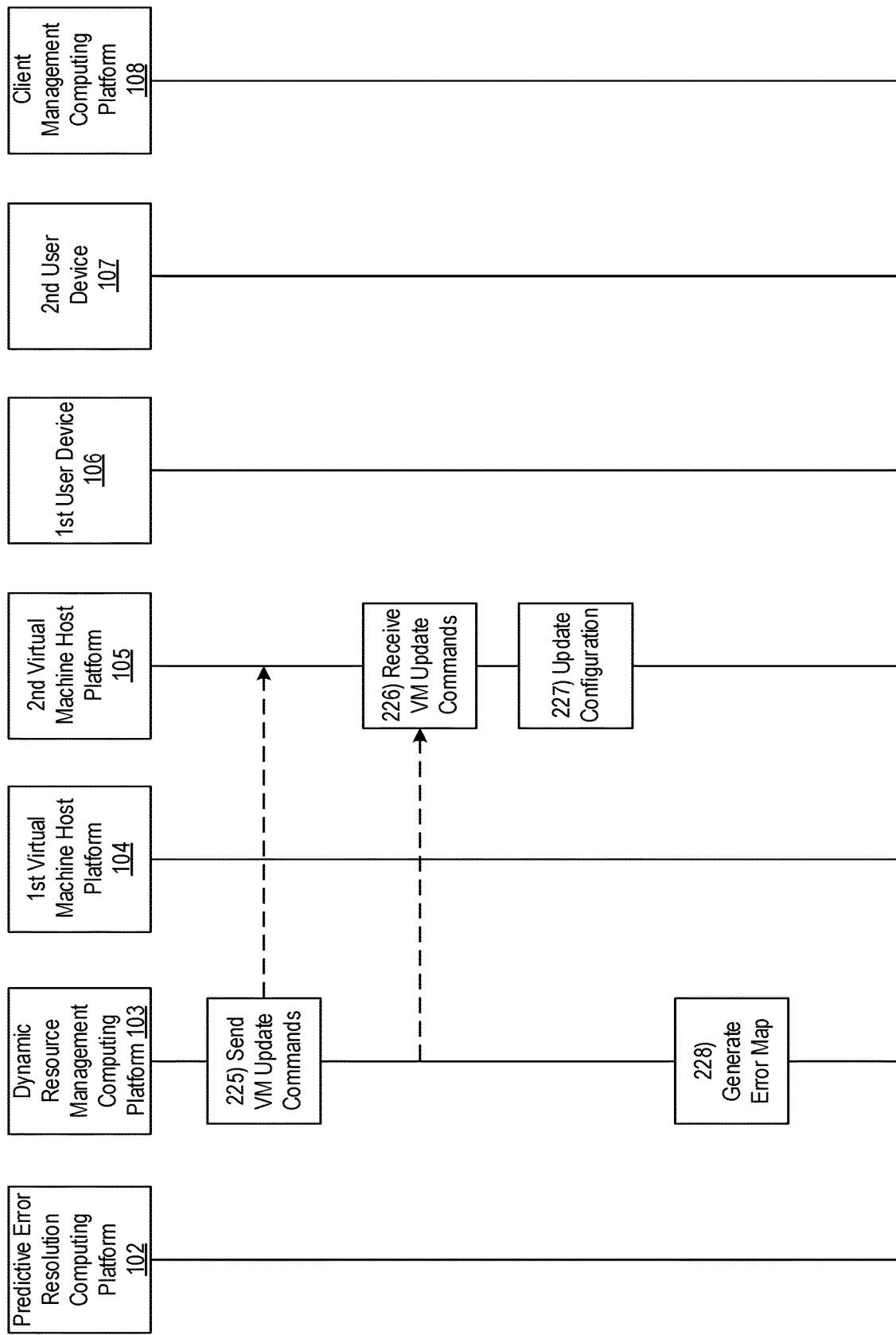

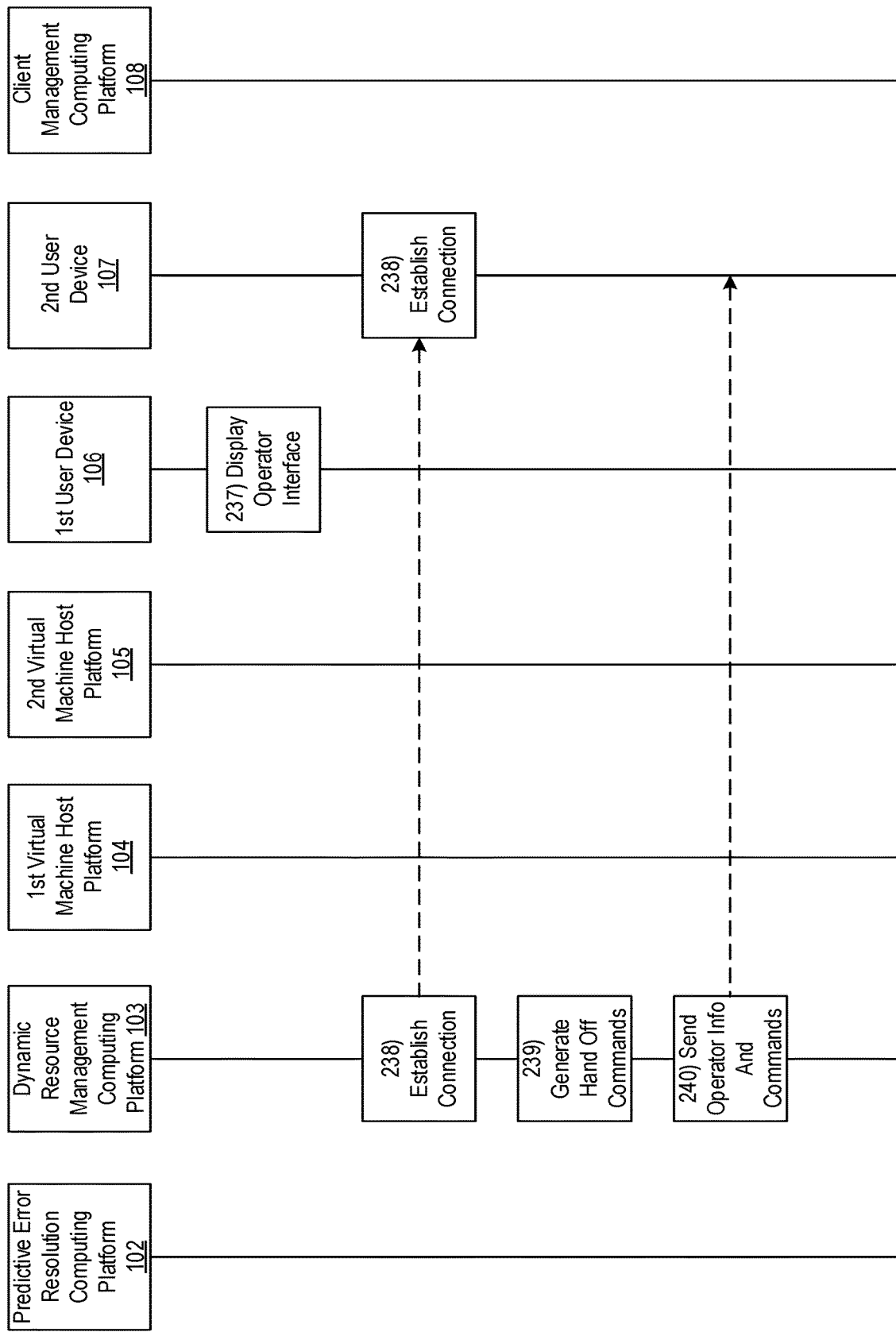

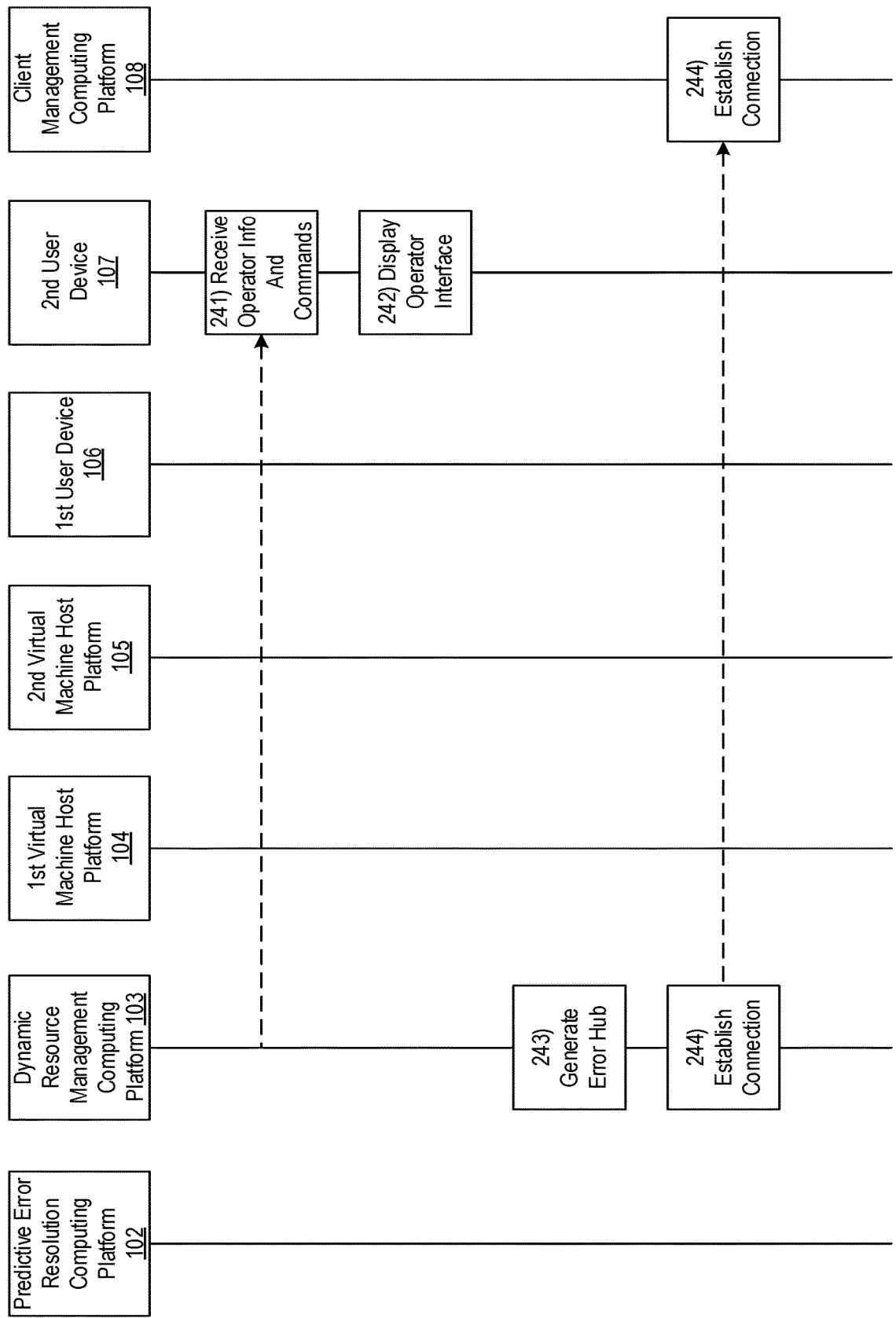

305

Operator Notification Interface

Virtual Machine Overload

Database Expert: Please Resolve

Error Resolution Hub

Error:                    Resolution Expert:

Resolution Method:        Estimated Resolution Time:

FIG. 4

PROCESSING SYSTEM FOR PERFORMING PREDICTIVE ERROR RESOLUTION AND DYNAMIC SYSTEM CONFIGURATION CONTROL

BACKGROUND

Aspects of the disclosure relate to enhanced processing systems for performing predictive error resolution and dynamic system configuration control. In particular, one or more aspects of the disclosure relate to predictive error resolution systems and dynamic system configuration control systems that utilize one or more error log files to perform error prediction, improve error resolution, and facilitate system configuration updates.

Because many organizations and individuals rely on electronic transfers as a method for exchanging secure data records, it may be important to predict potential errors in such transfers, adjust system configurations to avoid the potential errors, and efficiently resolve errors that do actually occur as a result of the electronic transfers. In many instances, however, it may be difficult to optimize technical performance and operating efficiency of the computing systems that perform electronic transfers while also ensuring that errors are effectively predicted, avoided to the maximum extent possible, and resolved when necessary.

SUMMARY

Aspects of the disclosure provide effective, efficient, scalable, and convenient technical solutions that address and overcome the technical problems associated with optimizing the performance of and ensuring the efficiency of predictive error resolution and dynamic system configuration control computer systems.

In accordance with one or more embodiments of the disclosure, a computing platform comprising at least one processor, a communication interface, and memory storing computing readable instructions may receive, from one or more virtual machine host platforms, one or more error log files identifying error codes corresponding to error occurrences associated with multiple applications running on the one or more virtual machine host platforms. Based on one or more error log files, the computing platform may generate an error lattice comprising an aggregation of the error codes corresponding to the error occurrences. Based on the error lattice, the computing platform may identify relationships between the error codes corresponding to the error occurrences. Based on the relationships between the error codes corresponding to the error occurrences, the computing platform may determine a predicted error outcome. Based on the predicted error outcome, the computing platform may determine a system configuration update to be applied to the one or more virtual machine host platforms. The computing platform may generate one or more commands directing a dynamic resource management computing platform to distribute relevant portions of the system configuration update to each of the one or more virtual machine host platforms. The computing platform may send, to the dynamic resource management computing platform, one or more commands directing the dynamic resource management computing platform to distribute the relevant portions of the system configuration update to each of the one or more virtual machine host platforms, wherein sending the one or more commands directing the dynamic resource management computing platform to distribute the relevant portions of the system configuration update to each of the one or more virtual machine host platforms causes the one or more virtual machine host platforms to implement the system configuration update.

In some embodiments, the computing platform may establish, with a first virtual machine host platform of the one or more virtual machine host platforms, a first wireless data connection. The computing platform may also establish, with a second virtual machine host platform of the one or more virtual machine host platforms, a second wireless data connection. The computing platform may establish, with the dynamic resource management computing platform, a third wireless data connection.

In some embodiments, the computing platform may receive the one or more error log files identifying the error codes corresponding to the error occurrences associated with multiple applications running on the one or more virtual machine host platforms by receiving, via the communication interface, the one or more error log files identifying the error codes corresponding to the error occurrences associated with multiple applications running on the one or more virtual machine host platforms. In some examples, the computing platform may send to the dynamic resource management computing platform the one or more commands directing the dynamic resource management computing platform to distribute the relevant portions of the system configuration update to each of the one or more virtual machine host platforms by sending, via the communication interface and to the dynamic resource management computing platform, the one or more commands directing the dynamic resource management computing platform to distribute the relevant portions of the system configuration update to each of the one or more virtual machine host platforms.

In some embodiments, the computing platform may determine, prior to determining the system configuration update to be applied to the one or more virtual machine host platforms, that the predicted error outcome exceeds a predetermined error outcome threshold.

In some embodiments, the computing platform may identify, based on the one or more error log files, an actual error. After identifying the actual error, the computing platform may send error information corresponding to the actual error to the dynamic resource management computing platform.

In some embodiments, the system configuration update comprises increasing a data capacity of at least one of the one or more virtual machine host platforms.

In some embodiments, the computing platform may generate the error lattice comprising an aggregation of the error codes corresponding to the error occurrences by generating the error lattice in real time as the one or more error log files identifying error codes corresponding to error occurrences associated with multiple applications running on the one or more virtual machine host platforms are received.

In accordance with one or more additional embodiments of the disclosure, a computing platform comprising at least one processor, a communication interface, and memory storing computer readable instructions may receive, from a predictive error resolution computing platform, one or more commands directing the computing platform to distribute relevant portions of a system configuration update. The computing platform may identify one or more virtual machine host platforms to which the system configuration update is applicable. Based on the system configuration update, the computing platform may generate one or more commands directing each of the one or more virtual machine host platforms to which the system configuration update is applicable to perform system updates based on the system configuration update. The computing platform may receive, from the one or more virtual machine host platforms, a configuration update confirmation notification. Based on at least one machine learning algorithm and at least one dataset, the computing platform may generate an error map identifying correlations between error codes and a respective operator for each error code. The computing platform may receive, from the predictive error resolution computing platform, error information comprising a plurality of error codes corresponding to error occurrences. Based on the error map, the computing platform may determine operator interface information indicating one or more operators associated with resolution of each of the plurality of error codes corresponding to the error occurrences. The computing platform may generate one or more hand off commands for one or more user devices, each hand off command of the one or more hand off commands being associated with an operator of the one or more operators, to cause display of an operator interface associated with the respective operator. Along with the one or more hand off commands, the computing platform may send, to the one or more user devices, the operator interface information. Based on the error occurrences and using at least one additional machine learning algorithm and at least one additional dataset, the computing platform may generate an error correction hub. The computing platform may generate one or more commands directing a client management computing platform to cause display of the error correction hub. Along with the one or more commands directing the client management computing platform to cause display of the error correction hub, the computing platform may send the error correction hub.

In some embodiments, the computing platform may establish, with the predictive error resolution computing platform, each of the one or more virtual machine host platforms, each of the one or more user devices, and the client management computing platform, wireless data connections.

In some embodiments, the computing platform may send, using the communication interface, using the wireless data connections, and to the one or more virtual machine host platforms to which the system configuration update is applicable, the one or more commands directing each of the one or more virtual machine host platforms to which the system configuration update is applicable to perform system updates based on the system configuration update.

In some embodiments, the computing platform may generate the error correction hub by generating a user interface displaying one or more of: the error occurrences, the one or more operators associated with resolution of each of the plurality of error codes corresponding to the error occurrences, a resolution method associated with resolution of each of the plurality of error codes corresponding to the error occurrences, and an estimated resolution time for conducting the resolution method associated with resolution of each of the plurality of error codes corresponding to the error occurrences.

In some embodiments, the computing platform may determine, based on one or more machine learning algorithms and one or more machine learning datasets, the resolution method associated with resolution of each of the plurality of error codes corresponding to the error occurrences and the estimated resolution time for conducting the resolution method associated with resolution of each of the plurality of error codes corresponding to the error occurrences.

In some embodiments, the computing platform may determine that the error map does not identify the error information comprising a plurality of error codes corresponding to error occurrences. The computing platform may also update, using the plurality of error codes corresponding to error occurrences and after determining operators corresponding to each of the plurality of error codes corresponding to error occurrences, the error map to identify the plurality of error codes and the operators.

In some embodiments, the computing platform may send to a second user device of the one or more user devices and after receiving an error code resolution indication from a first user device of the one or more user devices, the operator interface information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2L depict an illustrative event sequence for deploying an enhanced processing system that utilizes improved error prediction and dynamic system configuration control techniques in accordance with one or more example embodiments;

FIGS. 3 and 4 depict example graphical user interfaces for deploying an enhanced processing system that utilizes improved error prediction and dynamic system configuration control techniques in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
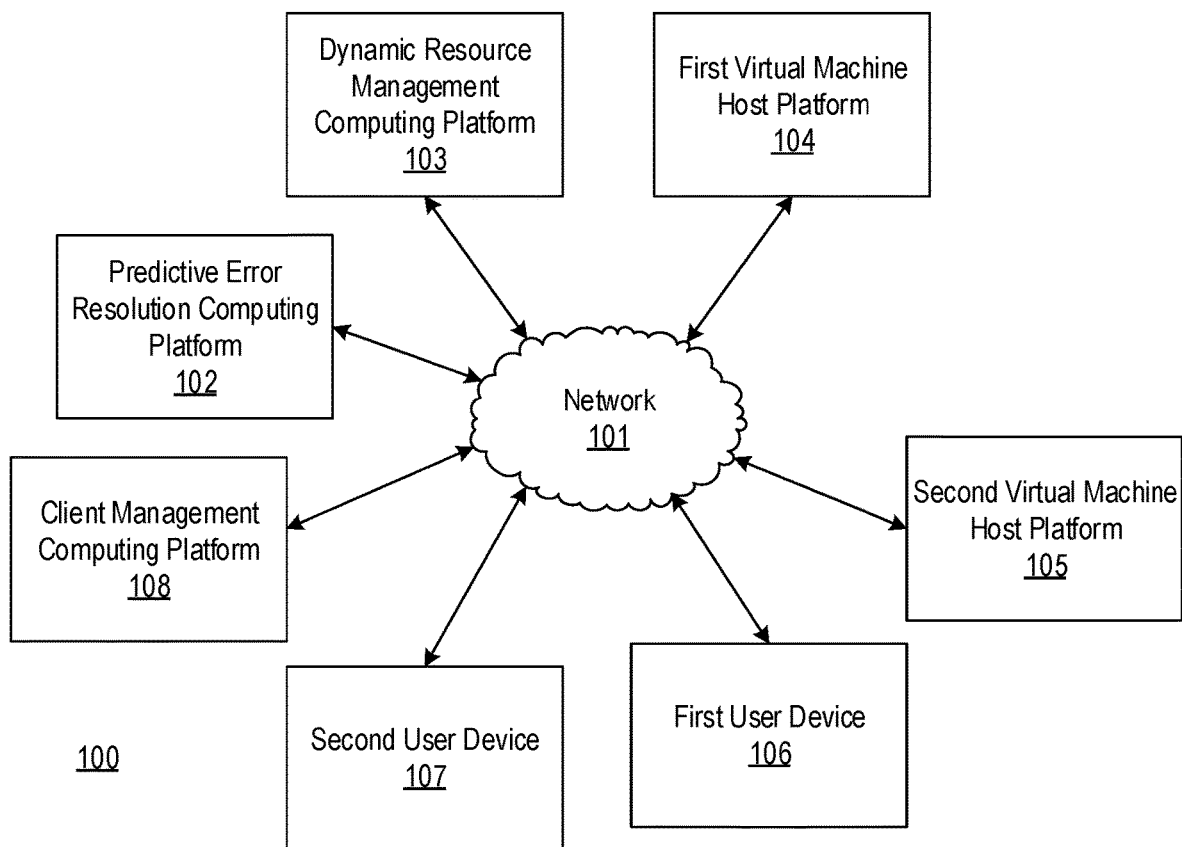
FIGS. 1A-1C depict an illustrative computing environment for deploying an enhanced processing system that utilizes improved error prediction and dynamic system configuration control techniques in accordance with one or more example embodiments.
Figure 1B:
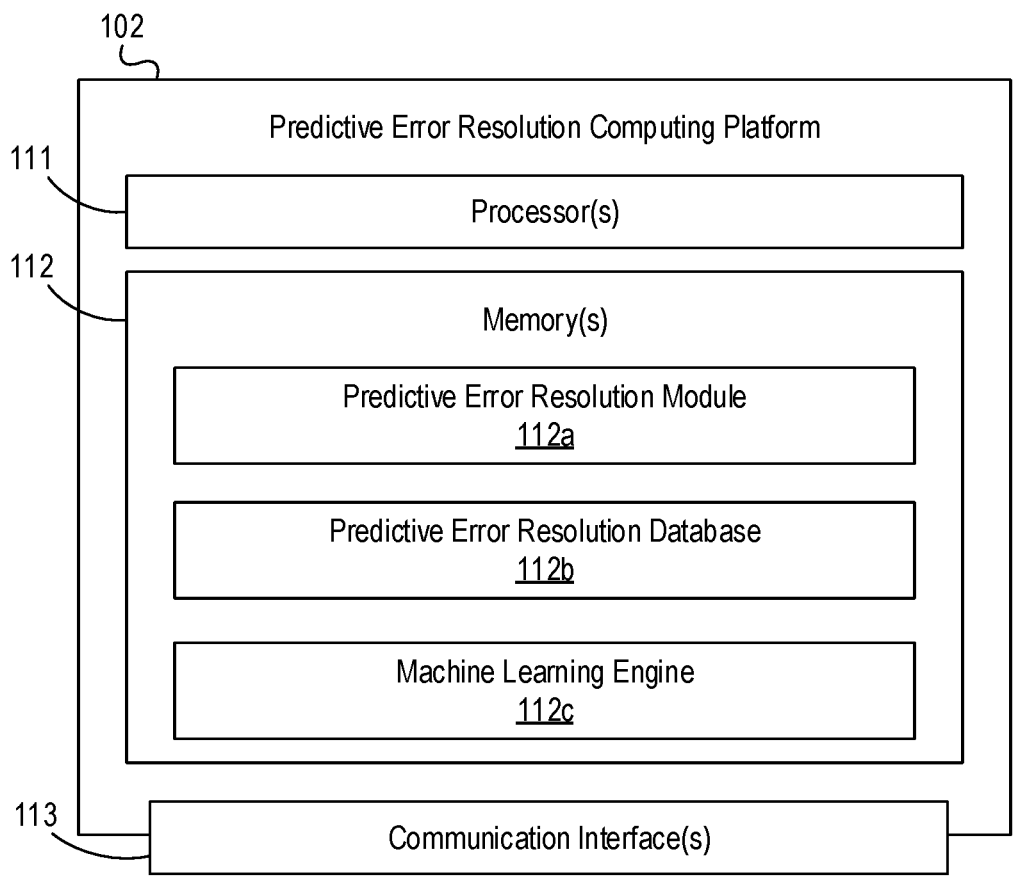
Figure 1C:
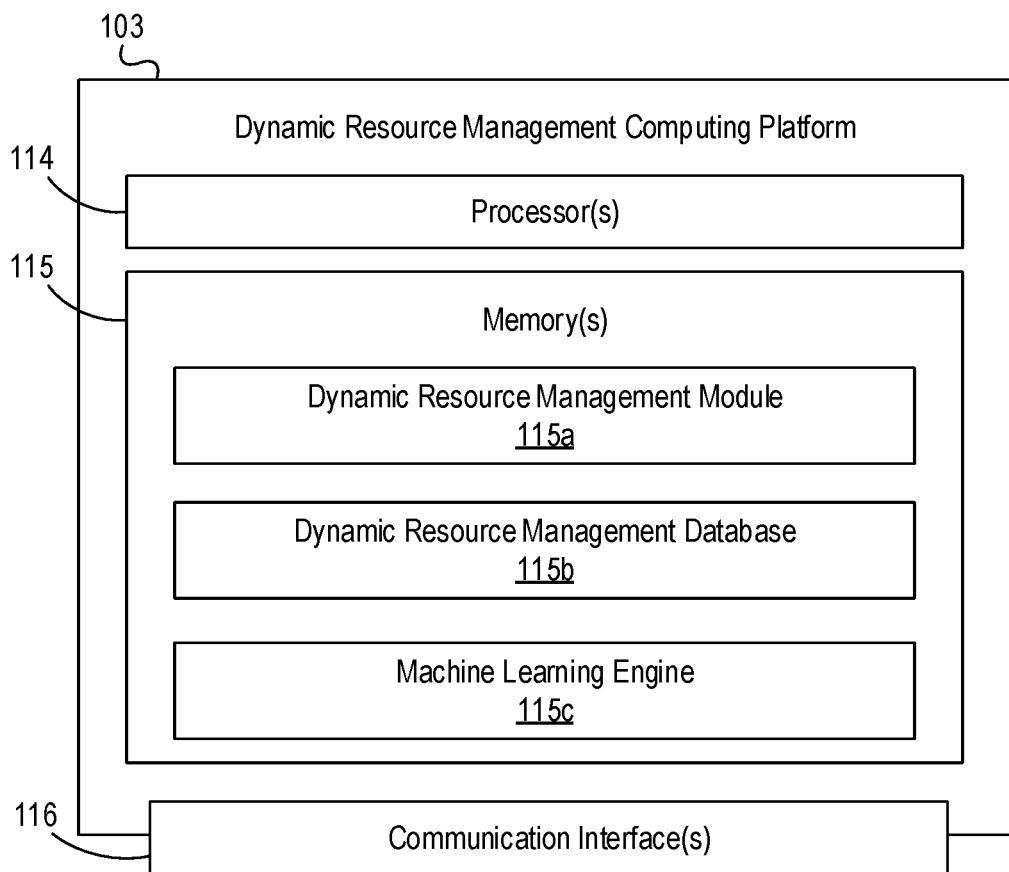

FIGS. 1A-1C depict an illustrative computing environment for deploying a processing system for performing predictive error resolution and dynamic system configuration control that utilizes improved error resolution techniques in accordance with one or more example embodiments. Referring to FIG. 1A, computing environment 100 may include one or more computer systems. For example, computing environment 100 may include a predictive error resolution computing platform 102, a dynamic resource management computing platform 103, a first virtual machine host platform 104, a second virtual machine host platform 105, a first user device 106, a second user device 107, and a client management computing platform 108.

As illustrated in greater detail below, predictive error resolution computing platform 102 may include one or more computing devices configured to perform one or more of the functions described herein. For example, predictive error resolution computing platform 102 may include one or more computers (e.g., laptop computers, desktop computers, servers, server blades, or the like).

As illustrated in greater detail below, dynamic resource management computing platform 103 may include one or more computing devices configured to perform one or more of the functions described herein. For example, dynamic resource management computing platform 103 may include one or more computers (e.g., laptop computers, desktop computers, servers, server blades, or the like).

First virtual machine host platform 104 may be a computer system that includes one or more computing devices and/or other computer components (e.g., processors, memories, communication interfaces). In addition, first virtual machine host platform 104 may be configured to receive requests (e.g., requests to adjust a system configuration from a dynamic resource management computing platform, such as dynamic resource management computing platform 103, and the like.) In some instances, the first virtual machine host platform 104 may generate an error log. The first virtual machine host platform 104 may send the error log to the predictive error resolution computing platform 102 for further analysis, as discussed in greater detail below.

Second virtual machine host platform 105 may be a computer system that includes one or more computing devices and/or other computer components (e.g., processors, memories, communication interfaces). In addition, second virtual machine host platform 105 may be configured to receive requests (e.g., requests to adjust a system configuration from a dynamic resource management computing platform, such as dynamic resource management computing platform 103, and the like.) In some instances, the second virtual machine host platform 105 may generate an error log. The second virtual machine host platform 105 may send the error log to the predictive error resolution computing platform 102 for further analysis, as discussed in greater detail below.

First user device 106 may include one or more computing devices and/or other computer components (e.g., processors, memories, communication interfaces). In addition, and as illustrated in greater detail below, first user device 106 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by first user device 106 may be associated with an internal portal provided by an organization, such as an error management portal provided by a financial institution. Such a portal may, for instance, provide employees of the financial institution with access to error information (e.g., error codes, types of errors, resolution methods, employees responsible for various errors, error resolution times, or the like) and/or may provide employees of the financial institution with menus, controls, and/or other options to execute various resolution actions (e.g., modify a system configuration, redirecting the error to another employee, initiate load balancing, or the like).

Second user device 107 may include one or more computing devices and/or other computer components (e.g., processors, memories, communication interfaces). In addition, and as illustrated in greater detail below, second user device 107 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by second user device 107 may be associated with an internal portal provided by an organization, such as an error management portal provided by a financial institution. Such a portal may, for instance, provide employees of the financial institution with access to error information (e.g., error codes, types of errors, resolution methods, employees responsible for various errors, error resolution times, or the like) and/or may provide employees of the financial institution with menus, controls, and/or other options to execute various resolution actions (e.g., modify a system configuration, redirecting the error to another employee, initiate load balancing, or the like).

Client management computing platform 108 may include one or more computing devices and/or other computer components (e.g., processors, memories, communication interfaces). In addition, and as illustrated in greater detail below, client management computing platform 108 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by client management computing platform may be associated with an internal portal provided by an organization, such as an error management portal provided by a financial institution. Such a portal may, for instance, provide employees of the financial institution with access to error information (e.g., error codes, types of errors, resolution methods, employees responsible for various errors, error resolution times, or the like) and/or may provide employees of the financial institution with menus, controls, and/or other options to execute various resolution actions (e.g., modify a system configuration, redirecting the error to another employee, initiate load balancing, or the like). Such a portal may alternatively be an external portal provided by an organization, such as an error management portal provided by a financial institution. Such a portal may, for instance, provide customers of the financial institution with access to error information (e.g., types of errors, resolution methods, employees responsible for various errors, error resolution times, or the like).

Computing environment 100 also may include one or more networks, which may interconnect predictive error resolution computing platform 102, dynamic resource management computing platform 103, first virtual machine host platform 104, second virtual machine host platform 105, first user device 106, second user device 107, and client management computing platform 108. For example, computing environment 100 may include a network 101 (which may interconnect, e.g., predictive error resolution computing platform 102, dynamic resource management computing platform 103, first virtual machine host platform 104, second virtual machine host platform 105, first user device 106, second user device 107, and client management computing platform 108).

In one or more arrangements, predictive error resolution computing platform 102, dynamic resource management computing platform 103, first virtual machine host platform 104, second virtual machine host platform 105, first user device 106, second user device 107, and client management computing platform 108, and/or the other systems included in computing environment 100 may be any type of computing device capable of receiving a user interface, receiving input via the user interface, and communicating the received input to one or more other computing devices. For example, predictive error resolution computing platform 102, dynamic resource management computing platform 103, first virtual machine host platform 104, second virtual machine host platform 105, first user device 106, second user device 107, and client management computing platform 108, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of predictive error resolution computing platform 102, dynamic resource management computing platform 103, first virtual machine host platform 104, second virtual machine host platform 105, first user device 106, second user device 107, and client management computing platform 108 may, in some instances, be special-purpose computing devices configured to perform specific functions.

Referring to FIG. 1B, predictive error resolution computing platform 102 may include one or more processors 111, memory 112, and communication interface 113. A data bus may interconnect processor 111, memory 112, and communication interface 113. Communication interface 113 may be a network interface configured to support communication between predictive error resolution computing platform 102 and one or more networks (e.g., network 101, or the like). Memory 112 may include one or more program modules having instructions that when executed by processor 111 cause predictive error resolution computing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of error resolution computing platform 102 and/or by different computing devices that may form and/or otherwise make up predictive error resolution computing platform 102. For example, memory 112 may have, store, and/or include a predictive error resolution module 112a, a predictive error resolution database 112b, and a machine learning engine 112c. Predictive error resolution module 112a may have instructions that direct and/or cause predictive error resolution computing platform 102 to execute advanced predictive error resolution techniques, as discussed in greater detail below. Predictive error resolution database 112b may store information used by predictive error resolution module 112a and/or predictive error resolution computing platform 102 in predictive error resolution and/or in performing other functions. Machine learning engine 112c may have instructions that direct and/or cause the predictive error resolution computing platform 102 to perform predictive error resolution and to set, define, and/or iteratively refine optimization rules and/or other parameters used by the predictive error resolution computing platform 102 and/or other systems in computing environment 100.

Referring to FIG. 1C, dynamic resource management computing platform 103 may include one or more processors 114, memory 115, and communication interface 116. A data bus may interconnect processor 114, memory 115, and communication interface 116. Communication interface 116 may be a network interface configured to support communication between dynamic resource management computing platform 103 and one or more networks (e.g., network 101, or the like). Memory 115 may include one or more program modules having instructions that when executed by processor 114 cause dynamic resource management computing platform 103 to perform one or more functions described herein and/or one or more databases that may store and/or otherwise maintain information which may be used by such program modules and/or processor 114. In some instances, the one or more program modules and/or databases may be stored by and/or maintained in different memory units of dynamic resource management computing platform 103 and/or by different computing devices that may form and/or otherwise make up dynamic resource management computing platform 103. For example, memory 115 may have, store, and/or include a dynamic resource management module 115a, a dynamic resource management database 115b, and a machine learning engine 115c. Dynamic resource management module 115a may have instructions that direct and/or dynamic resource management computing platform 103 to execute advanced dynamic resource management techniques, as discussed in greater detail below. Dynamic resource management database 115b may store information used by dynamic resource management module 115a and/or dynamic resource management computing platform 103 in dynamic resource management and/or in performing other functions. Machine learning engine 115c may have instructions that direct and/or cause the dynamic resource management computing platform 103 to perform dynamic resource management and to set, define, and/or iteratively refine optimization rules and/or other parameters used by the dynamic resource management computing platform 103 and/or other systems in computing environment 100.

Figure 2A:
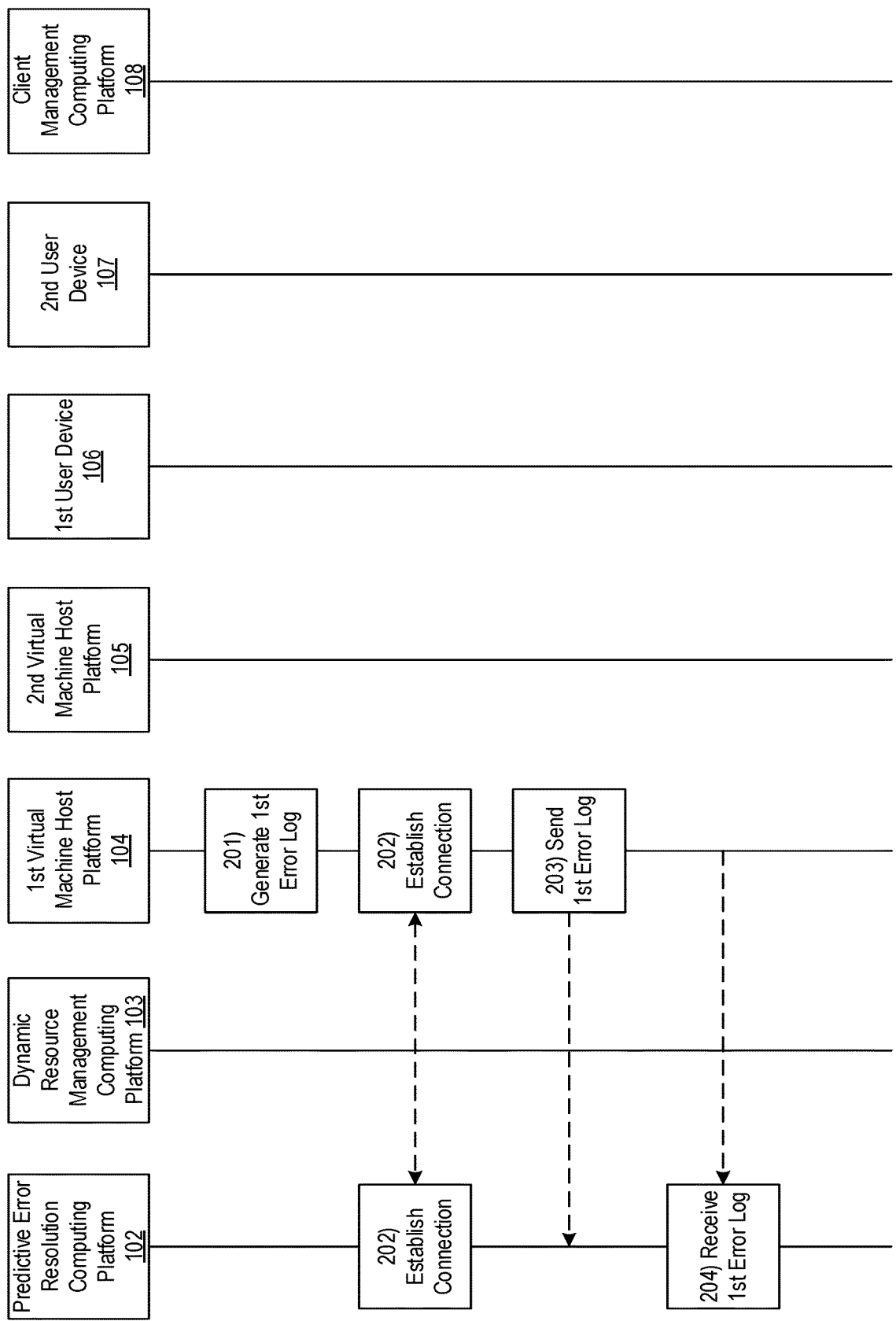

FIGS. 2A-2L depict an illustrative event sequence for deploying a processing system for performing error resolution and dynamic system configuration control that utilizes improved predictive error resolution and dynamic resource management techniques in accordance with one or more example embodiments. Referring to FIG. 2A, at step 201, first virtual machine host platform 104 may generate a first error log file. For example, the first virtual machine host platform 104 may attempt to process a plurality of payments and may experience a plurality of errors while doing so. For each of the plurality of errors, the first virtual machine host platform 104 may determine an error code representative of the respective errors. In generating the first error log, the first virtual machine host platform 104 may compile a list of error codes until expiration of a predetermined period of time. In another example, the first virtual machine host platform 104 may compile a list of error codes until determining a predetermined amount of errors. For example, the first virtual machine host platform 104 may continue to generate the first error log until it determines ten error codes. The predetermined amount of errors and the predetermined period of time may be determined using one or more machine learning algorithms and one or more machine learning datasets. The predetermined amount of errors and the predetermined period of time may also be configured by a user (such as an employee of a financial institution).

At step 202, first virtual machine host platform 104 may establish a connection to predictive error resolution computing platform 102. For example, the first virtual machine host platform 104 may establish a first wireless data connection to predictive error resolution computing platform 102 to link the first virtual machine host platform 104 to the predictive error resolution computing platform 102.

At step 203, the first virtual machine host platform 104 may send, to the predictive error resolution computing platform 102, the first error log file generated at step 201. For example, the first virtual machine host platform 104 may send, while the first wireless data connection is established, the first error log file. In some examples, the first virtual machine host platform 104 may send, at a predetermined interval, the first error log file. In other examples, the first virtual machine host platform 104 may send, after determining that the first error log file is complete, the first error log file.

At step 204, the predictive error resolution computing platform 102 may receive the first error log file from the first virtual machine host platform 104. For example, the predictive error resolution computing platform 102 may receive, while the first wireless data connection is established and via the communication interface 113, the first error log file.

Figure 2B:
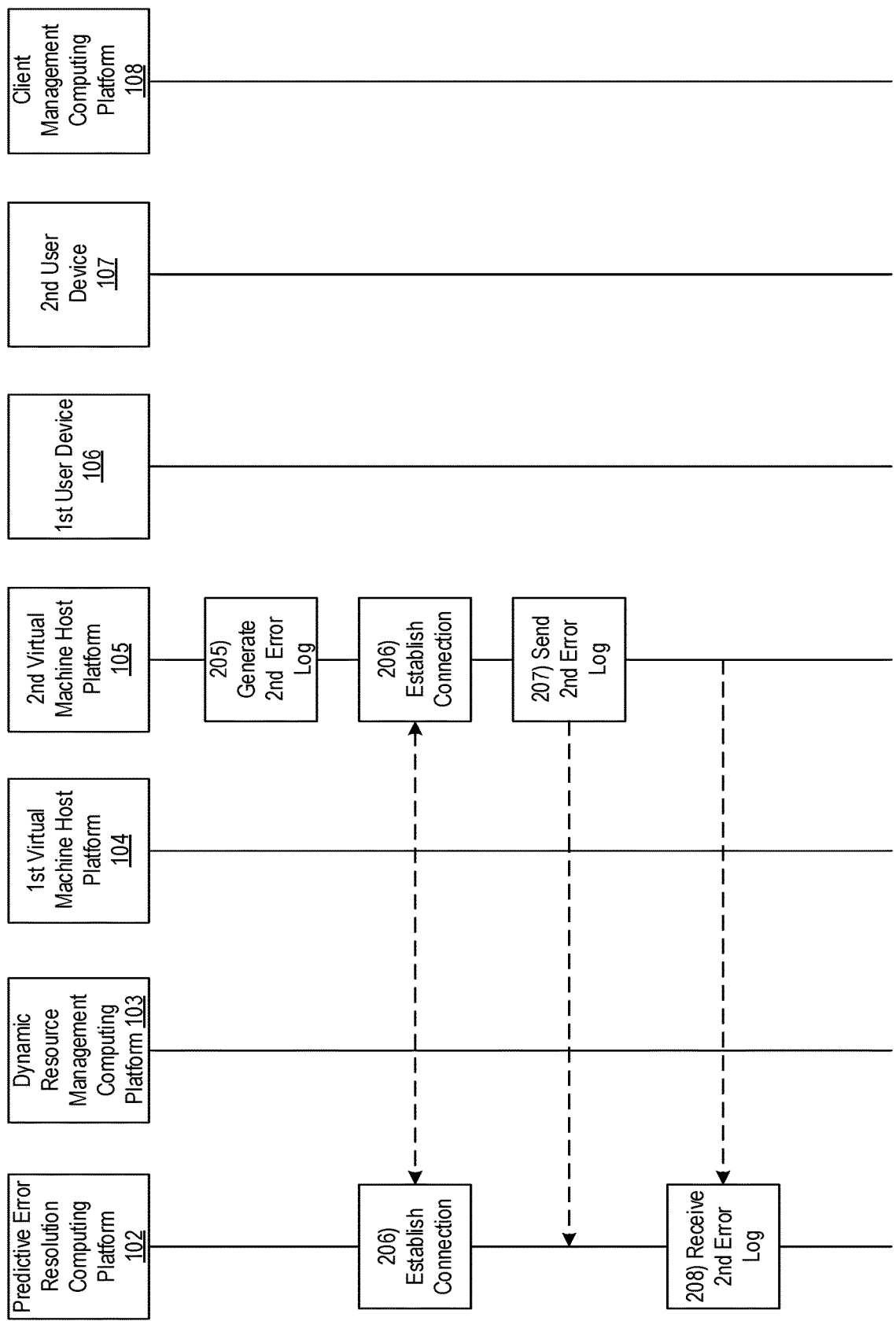

Referring to FIG. 2B, at step 205, second virtual machine host platform 105 may generate a second error log file. For example, the second virtual machine host platform 105 may attempt to process a plurality of payments and may experience a plurality of errors while doing so. For each of the plurality of errors, the second virtual machine host platform 105 may determine an error code representative of the respective errors. In generating the second error log, the second virtual machine host platform 105 may compile a list of error codes until expiration of a predetermined period of time. In another example, the first virtual machine host platform 104 may compile a list of error codes until determining a predetermined amount of errors. For example, the second virtual machine host platform 105 may continue to generate the second error log until it determines ten error codes. The predetermined amount of errors and the predetermined period of time may be determined using one or more machine learning algorithms and one or more machine learning datasets. The predetermined amount of errors and the predetermined period of time may also be configured by a user (such as an employee of a financial institution). In some examples, the first virtual machine host platform 104 and the second virtual machine host platform 105 may be located in separate countries. Actions performed at step 205 may be similar to those described above with regard to step 201.

At step 206, second virtual machine host platform 105 may establish a connection to predictive error resolution computing platform 102. For example, the second virtual machine host platform 105 may establish a second wireless data connection to predictive error resolution computing platform 102 to link the second virtual machine host platform 105 to the predictive error resolution computing platform 102. Actions performed at step 206 may be similar to those described above with regard to step 202.

At step 207, the second virtual machine host platform 105 may send, to the predictive error resolution computing platform 102, the second error log file generated at step 205. For example, the second virtual machine host platform 105 may send, while the second wireless data connection is established, the second error log file. In some examples, the second virtual machine host platform 105 may send, at a predetermined interval, the second error log file. In other examples, the second virtual machine host platform 105 may send, after determining that the second error log file is complete, the second error log file. Actions performed at step 207 may be similar to those described above with regard to step 203.

At step 208, the predictive error resolution computing platform 102 may receive the second error log file from the second virtual machine host platform 105. For example, the predictive error resolution computing platform 102 may receive, while the second wireless data connection is established and via the communication interface 113, the second error log file. Actions performed at step 208 may be similar to those described above with regard to step 204.

Figure 2C:
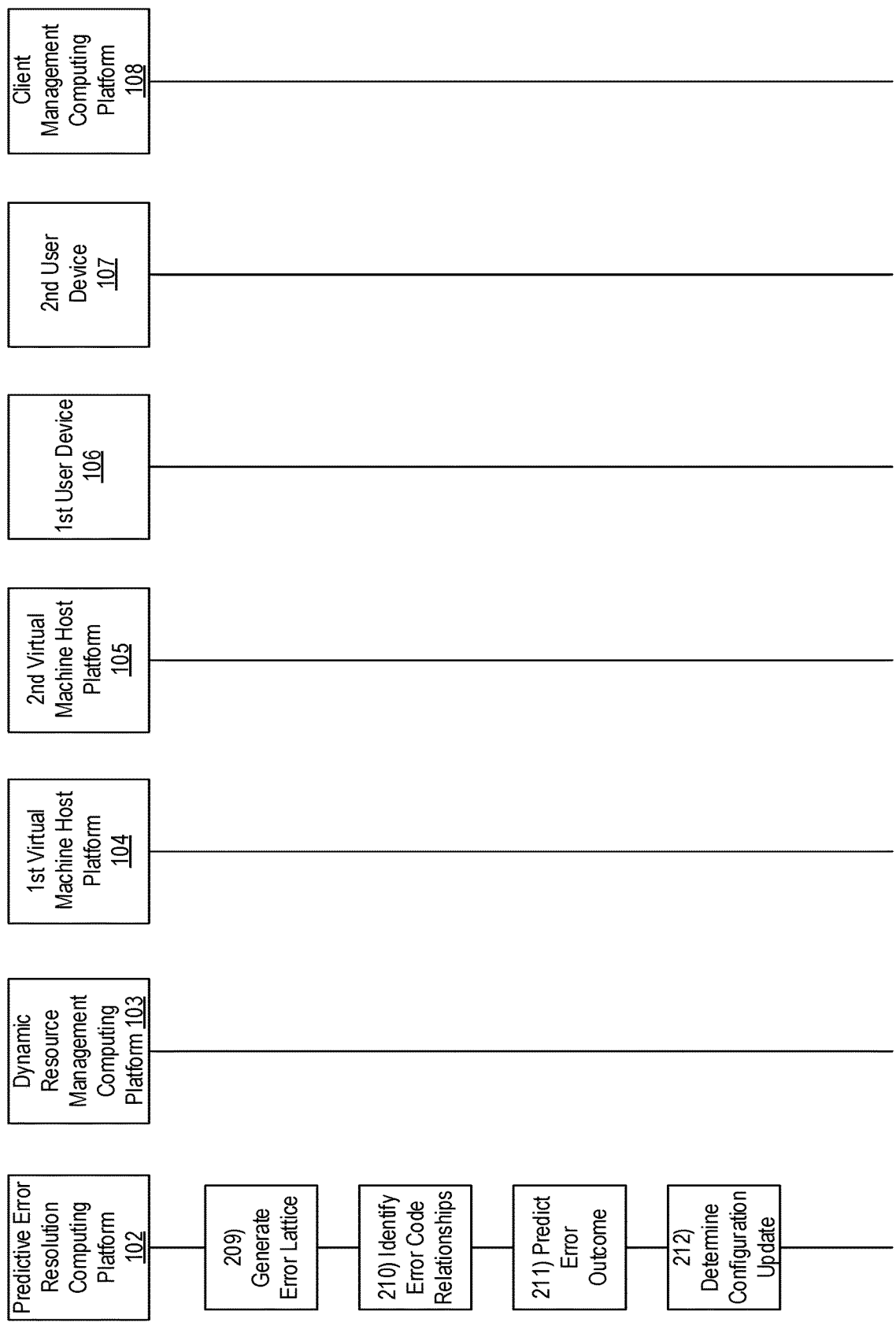

Referring to FIG. 2C, at step 209, the predictive error resolution computing platform 102 may generate an error lattice. For example, the predictive error resolution computing platform 102 may combine, in real time, error codes included in the first error log file and error codes included in the second error log file. In generating the error lattice, the predictive error resolution computing platform 102 may compile a list of error codes from multiple virtual machine host platforms (such as first virtual machine host platform 104 and second virtual machine host platform 105). In some examples, in generating the error lattice, the predictive error resolution computing platform 102 may generate a spreadsheet including a column corresponding to each of the multiple virtual machine host platforms. Thus, by generating the error lattice, the predictive error resolution computing platform 102 may generate a spreadsheet containing a list of error codes corresponding to each of the multiple virtual machines. For example, Column A of the spreadsheet may correspond to a first virtual machine and may list a plurality of error codes corresponding to the first virtual machine. In this example, Column B of the spreadsheet may correspond to a second virtual machine and may list a plurality of error codes corresponding to the second virtual machine. The predictive error resolution computing platform 102 may also determine, based on the error codes in the error lattice, error occurrences corresponding to the error codes and a timestamp of the error occurrences. For example, the predictive error resolution computing platform 102 may determine, based on one of the error codes, that a virtual machine host platform (such as the first virtual machine host platform 104 or the second virtual machine host platform 105) is overexerting, thus resulting in a memory leak, between 4 PM and 5 PM on a particular day.

At step 210, the predictive error resolution computing platform 102 may identify error code relationships using the error lattice. For example, the predictive error resolution computing platform 102 may determine that multiple virtual machine host platforms (such as the first virtual machine host platform 104 and the second virtual machine host platform 105) are experiencing the same errors. For example, the predictive error resolution computing platform 102 may determine that multiple virtual machine host platforms (such as the first virtual machine host platform 104 and the second virtual machine host platform 105) are outputting the same error codes during similar time periods. In some examples, the predictive error resolution computing platform 102 may determine that the multiple virtual machine host platforms are each being overexerted between 4 PM and 5 PM on Monday through Friday.

At step 211, the predictive error resolution computing platform 102 may determine a predicted error outcome. In determining the predicted error outcome, the predictive error resolution computing platform 102 may determine a consequence of previously accumulated error occurrences. For example, the predictive error resolution computing platform 102 may determine, based on the error code relationships, that a likelihood of a particular error occurring exceeds a predetermined error outcome threshold. As an example, if the predictive error resolution computing platform 102 determined, at step 210, that the multiple virtual machine host platforms are each being overexerted between 4 PM and 5 PM on Monday-Friday, the predictive error resolution computing platform 102 may determine that the multiple virtual machine host platforms may be overexerted the following Monday as well. If the predictive error resolution computing platform 102 determines that the likelihood of the predicted error outcome does not exceed the predetermined error outcome threshold, the predictive error resolution computing platform 102 may continue to receive additional error logs until a predicted error outcome, exceeding the predetermined error outcome threshold, is determined. If the predictive error resolution computing platform 102 determines that the likelihood of the predicted error outcome does exceed the predetermined error outcome threshold, the predictive error resolution computing platform 102 may proceed to step 212.

At step 212, predictive error resolution computing platform 102 may determine a system configuration update to be applied to the multiple virtual machine host platforms. For example, if at step 211, the predictive error resolution computing platform 102 determines a predicted error outcome indicating that the multiple virtual machine host platforms may be overexerted tomorrow between 4 PM-5 PM, the predictive error resolution computing platform 102 may determine a system configuration update indicating that processing power of the multiple virtual machine host platforms should be increased during this timeframe. In another example, the predictive error resolution computing platform 102 may determine that additional computing resources (such as additional virtual machine host platforms) should be added to the network to reduce processing load on the multiple virtual machine host platforms during this timeframe. In yet another example, the predictive error resolution computing platform 102 may determine that requests to the multiple virtual machine host platforms should be routed through a load balancing computing platform that may allocate requests to various virtual machine host platforms based on available processing power. In some examples, the predictive error resolution computing platform 102 may determine the system configuration update using one or more machine learning algorithms and one or more machine learning datasets.

Referring to FIG. 2D, at step 213, the predictive error resolution computing platform 102 may generate one or more commands directing the dynamic resource management computing platform 103 to distribute relevant portions of the system configuration update to each of the multiple virtual machine host platforms.

At step 214, the predictive error resolution computing platform 102 may establish a connection to dynamic resource management computing platform 103. For example, the predictive error resolution computing platform 102 may establish a third wireless data connection to dynamic resource management computing platform 103 to link the predictive error resolution computing platform 102 to the dynamic resource management computing platform 103.

At step 215, the predictive error resolution computing platform 102 may send, to the dynamic resource management computing platform 103, the one or more commands generated at step 213. For example, the predictive error resolution computing platform 102 may send, while the third wireless data connection is established and via the communication interface 113, the one or more commands.

At step 216, the dynamic resource management computing platform 103 may receive the one or more commands from the predictive error resolution computing platform 102. For example, the dynamic resource management computing platform 103 may receive, while the third wireless data connection is established and via the communication interface 116, the one or more commands directing the dynamic management computing platform 103 to distribute relevant portions of the system configuration update to each of the multiple virtual machine host platforms.

Figure 2E:
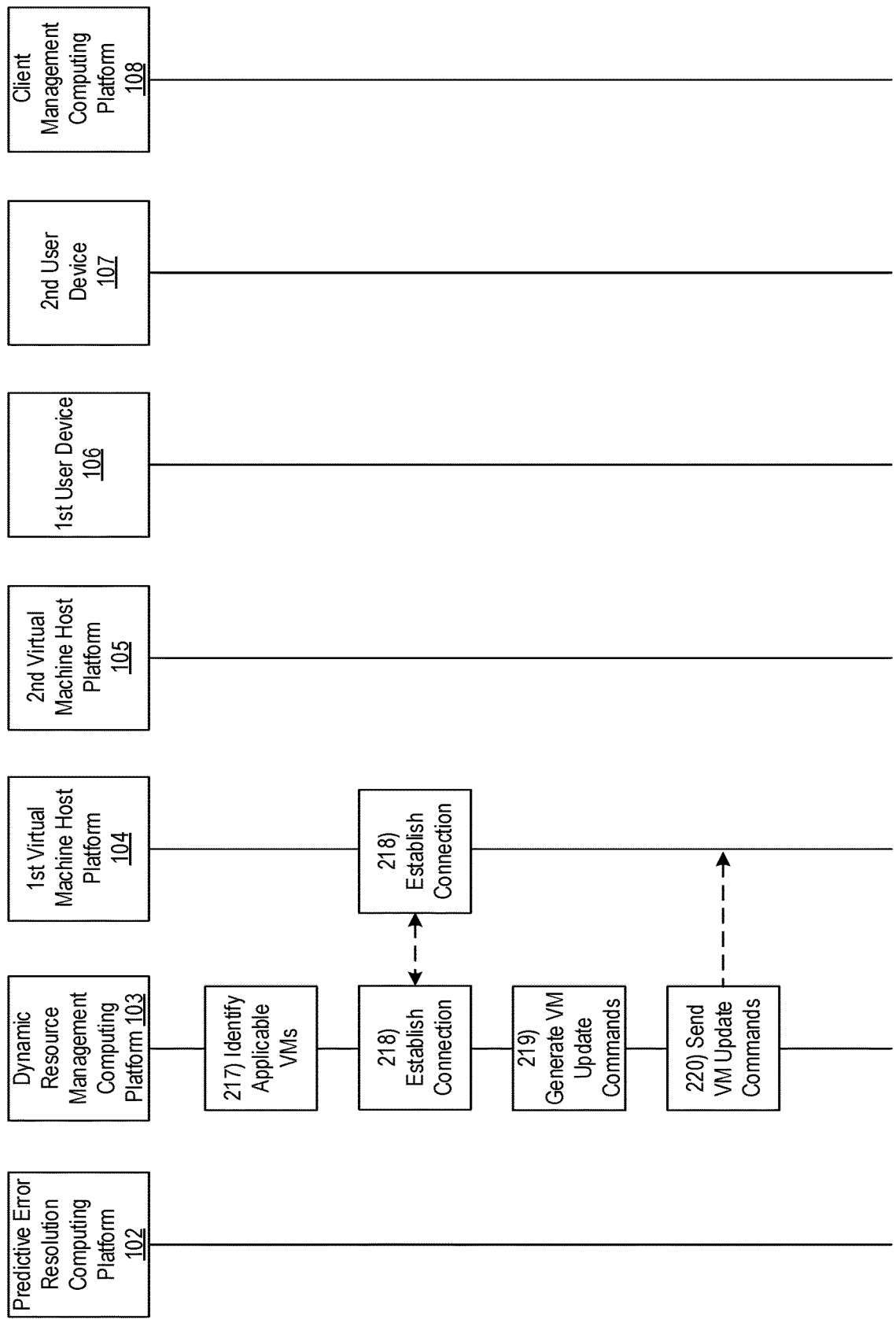

Referring to FIG. 2E, at step 217, the dynamic resource management computing platform 103 may identify one or more virtual machine host platforms to which the system configuration update is applicable. For example, dynamic resource management computing platform 103 may determine that the system configuration update indicates that a processing capacity of both the first virtual machine host platform 104 and the second virtual machine host platform 105 should be increased. In this example, the dynamic resource management computing platform 103 may identify the first virtual machine host platform 104 and the second virtual machine host platform 105 as virtual machine host platforms to which the system configuration update is applicable. In some examples, the dynamic resource management computing platform 103 may determine the virtual machine host platforms to which the system configuration update is applicable based on a device identifier included in the one or more commands received at step 216.

At step 218, dynamic resource management computing platform 103 may establish a connection to first virtual machine host platform 104. For example, the dynamic resource management computing platform 103 may establish a fourth wireless data connection to the first virtual machine host platform 104 to link the dynamic resource management computing platform 103 to the first virtual machine host platform 104.

At step 219, the dynamic resource management computing platform 103 may generate one or more commands directing the first virtual machine host platform 104 to perform system updates based on the system configuration update. For example, the dynamic resource management computing platform 103 may generate one or more commands directing the first virtual machine host platform 104 to increase processing speed using an oversubscription model. In another example, the dynamic resource management computing platform 103 may generate one or more commands directing the first virtual machine host platform 104 to decrease processing speed (to allow for increase capability by another virtual machine host platform). In yet another example, the dynamic resource management computing platform 103 may generate one or more commands directing the first virtual machine host platform 104 to turn on and to share the processing load with the other virtual machine host platforms that may already be turned on. In yet another example, the dynamic resource management computing platform 103 may generate one or more commands directing the first virtual machine host platform 104 to recycle requests to avoid a backlog. In yet another example, the dynamic resource management computing platform 103 may generate one or more commands directing the first virtual machine host platform 104 to increase or decrease a data processing capacity.

At step 220, the dynamic resource management computing platform 103 may send, to the first virtual machine host platform 104, the one or more commands generated at step 219. For example, the dynamic resource management computing platform 103 may send, while the fourth wireless data connection is established and via the communication interface 116, the one or more commands directing the first virtual machine host platform 104 to perform system updates based on the system configuration update.

Referring to FIG. 2F, at step 221, the first virtual machine host platform 104 may receive the one or more commands from the dynamic resource management computing platform 103. For example, the first virtual machine host platform 104 may receive, while the fourth wireless data connection is established, the one or more commands directing the first virtual machine host platform 104 to perform system updates based on the system configuration update.

At step 222, the first virtual machine host platform 104 may perform a system update based on the commands received at step 221. In performing the system update, the first virtual machine host platform 104 may perform at least one of: turn on, turn off, increase data capacity, decrease data capacity, ramp up processing, or slow down processing. After performing the system update, the first virtual machine host platform 104 may send, to the dynamic resource management computing platform 103, a configuration update confirmation notification indicating that the system update has been performed.

At step 223, dynamic resource management computing platform 103 may establish a connection to second virtual machine host platform 105. For example, the dynamic resource management computing platform 103 may establish a fifth wireless data connection to the second virtual machine host platform 105 to link the dynamic resource management computing platform 103 to the second virtual machine host platform 105.

At step 224, the dynamic resource management computing platform 103 may generate one or more commands directing the second virtual machine host platform 105 to perform system updates based on the system configuration update. For example, the dynamic resource management computing platform 103 may generate one or more commands directing the second virtual machine host platform 105 to increase processing speed using an oversubscription model. In this example, the dynamic resource management computing platform 103 may increase a quantity of requests routed to the second virtual machine host platform 105. In another example, the dynamic resource management computing platform 103 may generate one or more commands directing the second virtual machine host platform 105 to decrease processing speed (to allow for increase capability by another virtual machine host platform). In yet another example, the dynamic resource management computing platform 103 may generate one or more commands directing the second virtual machine host platform 105 to turn on and to share the processing load with the other virtual machine host platforms that may already be turned on. In yet another example, the dynamic resource management computing platform 103 may generate one or more commands directing the second virtual machine host platform 105 to recycle requests to avoid a backlog. For example, rather than accumulating a queue of requests at the second virtual machine host platform 105, the second virtual machine host platform 105 may delete the request, and the request may be routed to a different virtual machine host platform. In yet another example, the dynamic resource management computing platform 103 may generate one or more commands directing the second virtual machine host platform 105 to increase or decrease a data processing capacity. Actions performed at step 224 may be similar to those described above with regard to step 219.

Referring to FIG. 2G, at step 225, the dynamic resource management computing platform 103 may send, to the second virtual machine host platform 105, the one or more commands generated at step 224. For example, the dynamic resource management computing platform 103 may send, while the fifth wireless data connection is established and via the communication interface 116, the one or more commands directing the second virtual machine host platform 105 to perform system updates based on the system configuration update. Actions performed at step 225 may be similar to those described above with regard to step 220.

At step 226, the second virtual machine host platform 105 may receive the one or more commands from the dynamic resource management computing platform 103. For example, the second virtual machine host platform 105 may receive, while the fourth wireless data connection is established, the one or more commands directing the second virtual machine host platform 105 to perform system updates based on the system configuration update. Actions performed at step 226 may be similar to those described above with regard to step 221.

At step 227, the second virtual machine host platform 105 may perform a system update based on the commands received at step 226. In performing the system update, the second virtual machine host platform 105 may perform at least one of: turn on, turn off, increase data capacity, decrease data capacity, ramp up processing, or slow down processing. After performing the system update, the second virtual machine host platform 105 may send, to the dynamic resource management computing platform 103, a configuration update confirmation notification indicating that the system update has been performed. Actions performed at step 227 may be similar to those described above with regard to step 222.

In some instances, the dynamic resource management computing platform 103 may determine whether an additional virtual machine host platform should be directed to perform a system configuration update. If the dynamic resource management computing platform determines that an additional virtual machine host platform should be directed to perform a system configuration update, steps 223-227 may be repeated with regard to the additional virtual machine host platform. If the dynamic resource management computing platform 103 determines that an additional virtual machine host platform should not be directed to perform a system configuration update, the dynamic resource management computing platform 103 may continue to step 228.

At step 228, the dynamic resource management computing platform 103 may generate an error map. For example, in generating the error map, the dynamic resource management computing platform 103 may determine, using one or more machine learning algorithms and one or more machine learning datasets, an operator corresponding to resolution of each of a plurality of error codes. For example, in generating the error map, the dynamic resource management computing platform 103 may generate an indication that one of a database team member, a client solutions team member, a management team member, and the like is responsible for resolution of a particular error code. In some examples, in generating the error map, the dynamic resource management computing platform 103 may generate a spreadsheet listing error codes in a first column and a corresponding operator responsible for resolution of each of the error codes in a second column. After generating the error map, the dynamic resource management computing platform 103 may store the error map using, for example, the memory 115.

If the dynamic resource management computing platform 103 determines that a received error code is not listed in the error map, the dynamic resource management computing platform may determine an operator associated with resolution of the error code, and may then store the new error code and the corresponding operator in the error map. In some examples, the dynamic resource management computing platform 103 may determine the operator of a new error code by receiving input from an operator attempting to resolve the new error code. Once this input is received, the dynamic resource management computing platform 103 may determine the operator of the new error code. In other examples, the dynamic resource management computing platform 103 may determine the operator using one or more machine learning algorithms and one or more machine learning datasets.

Figure 2H:
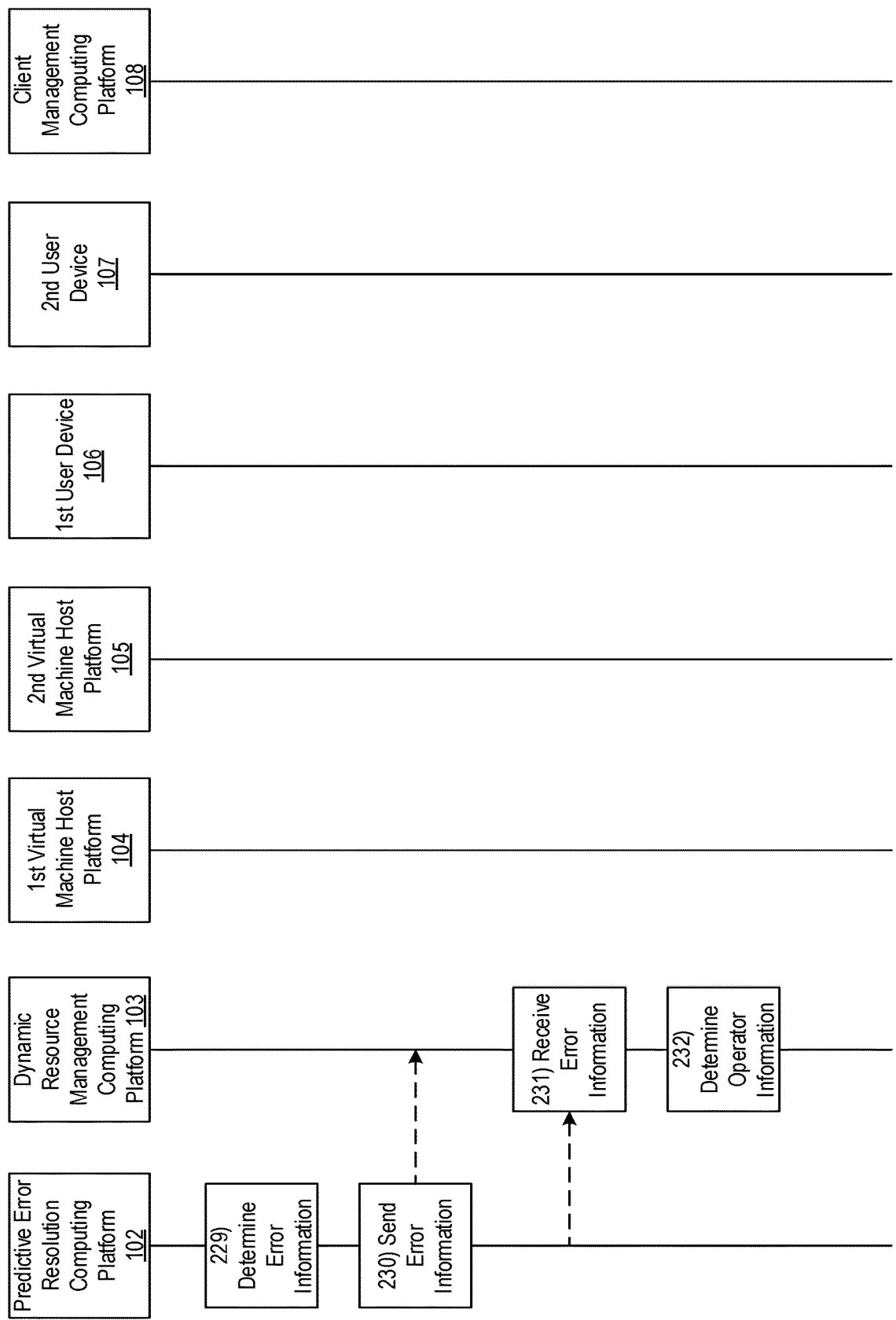

Referring to FIG. 2H, at step 229, the predictive error resolution computing platform 102 may determine error information. For example, the predictive error resolution computing platform 102 may determine that an actual error is occurring (as opposed to predicting a potential error). The predictive error resolution computing platform 102 may determine the actual error based on one of the first error log or the second error log. If an actual error is determined, the predictive error resolution computing platform 102 may proceed to step 230. If the predictive error resolution computing platform 102 does not determine an actual error, the predictive error resolution computing platform 102 may continue to receive error logs, predict error outcomes, and determine system configuration updates until an actual error is determined.

At step 230, the predictive error resolution computing platform 102 may send the error information determined at step 229 to the dynamic resource management computing platform 103. The error information may include one or more error codes corresponding to the actual error determined at step 229. For example, the predictive error resolution computing platform 102 may send, while the third wireless data connection is established and via the communication interface 113, the error information.

At step 231, dynamic resource management computing platform 103 may receive the error information from the predictive error resolution computing platform 102. For example, the dynamic resource management computing platform 103 may receive, while the third wireless data connection is established and via the communication interface 116, the error information.

At step 232, the dynamic resource management computing platform 103 may determine operator interface information. For example, using the error information received at step 231 and the error map generated at step 228, the dynamic resource management computing platform 103 may determine the operator information. The dynamic resource management computing platform 103 may determine the one or more error codes included in the error information. The dynamic resource management computing platform 103 may then perform a lookup function to locate the one or more error codes within the error map. By performing the lookup function, the dynamic resource management computing platform 103 may determine one or more operators who may be tasked with resolving the actual error determined at step 229. Using an identity of the determined operator, the dynamic resource management computing platform 103 may generate operator information. In some instances, the dynamic resource management computing platform 103 may determine that the error map does not identify a particular error code. In this instance, the dynamic resource management computing platform 103 may determine one or more operators corresponding to the particular code using, for example, one or more machine learning algorithms and one or more machine learning datasets. After determining the one or more operators corresponding to the particular code, the dynamic resource management computing platform 103 may update the error map to identify the particular code and the corresponding operators.

Figure 2I:
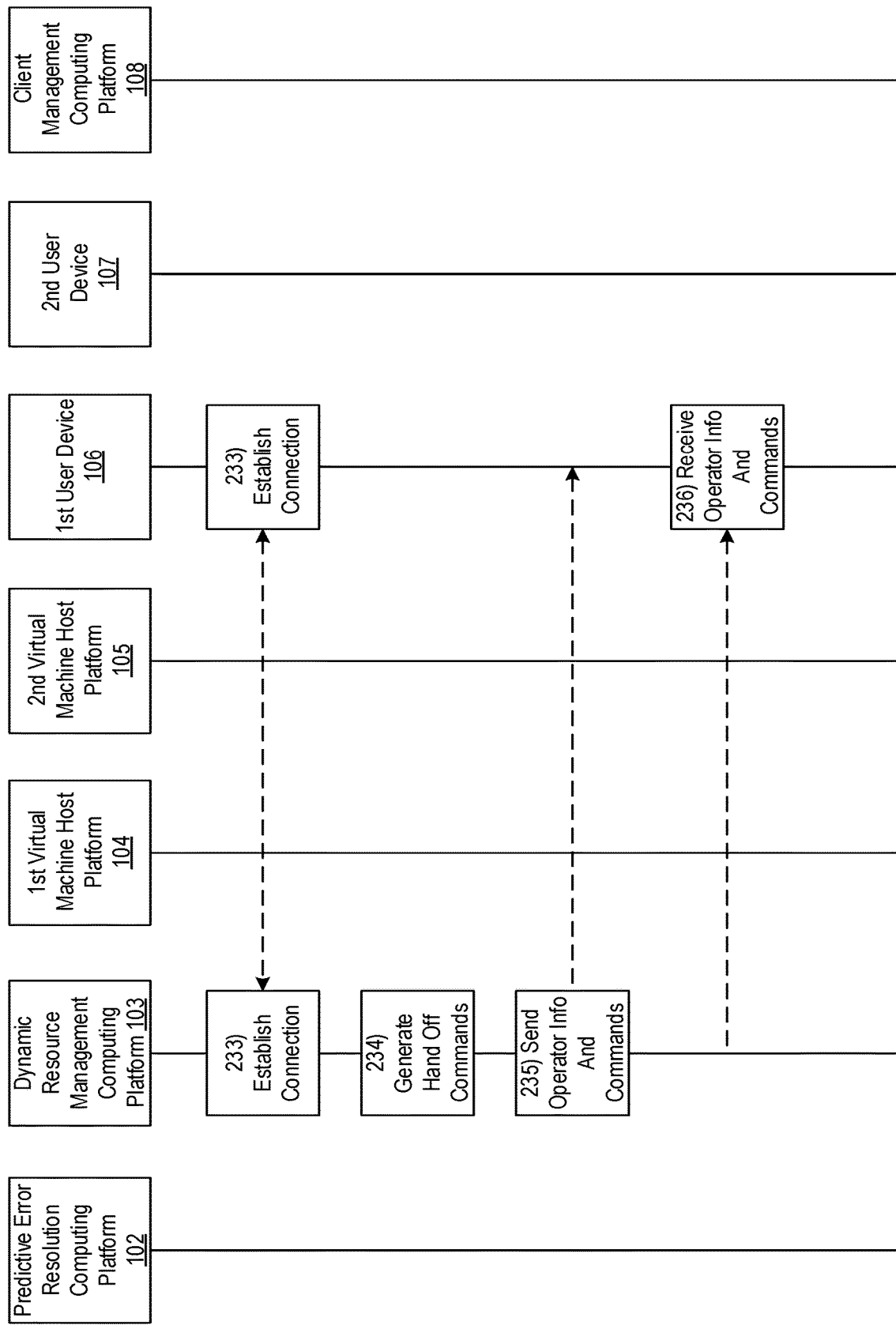

Referring to FIG. 2I, at step 233, the dynamic resource management computing platform 103 may establish a connection to first user device 106. For example, the dynamic resource management computing platform 103 may establish a sixth wireless data connection to the first user device 106 to link the dynamic resource management computing platform 103 to the first user device 106.

At step 234, the dynamic resource management computing platform 103 may generate one or more hand off commands directing the first user device, corresponding to a first operator, to cause display of an operator interface corresponding to the first operator. For example, after determining that the first operator is responsible for resolution of a first error code in the error information, the dynamic resource management computing platform 103 may generate one or more hand off commands directing the first user device 106, corresponding to the first operator, to notify the first operator of the first error code by generating the operator interface corresponding to the first operator.

At step 235, the dynamic resource management computing platform 103 may send, to the first user device, the one or more hand off commands generated at step 234. For example, the dynamic resource management computing platform 103 may send, while the sixth wireless data connection is established, via the communication interface 116, and along with the operator interface information, the one or more hand off commands directing the first user device 106 to notify the first operator of the first error code by generating the operator interface corresponding to the first operator.

At step 236, the first user device 106 may receive the operator interface information and the one or more hand off commands from the dynamic resource management computing platform 103. For example, the first user device 106 may receive, while the sixth wireless data connection is established, the one or more hand off commands directing the first user device 106 to notify the first operator of the first error code by generating the operator interface corresponding to the first operator Referring to FIG. 2J, at step 237, the first user device 106 may generate and cause display of a first operator notification interface (e.g., based on the operator interface information and the one or more hand off commands directing the first user device 106 to notify the first operator of the first error code by generating the first operator interface). For example, the first user device 106 may display and/or otherwise present a graphical user interface similar to graphical user interface 305, which is illustrated in FIG. 3. As seen in FIG. 3, graphical user interface 305 may include an indication of the error and an instruction for the first operator to resolve the error. For example, the graphical user interface 305 may indicate "Virtual Machine Overload; Database Expert: Please Resolve." Although FIG. 3 shows an error and an instruction to resolve the error, it should be understood that other source data associated with the error may also be displayed via the graphical user interface 305. For example, graphical user interface 305 may include an option to delegate resolution of the error to another available operator, an option to show instructions for resolving the error, an average resolution time for the error, and the like.

In some examples, the graphical user interface 305 may be displayed via a notification, an SMS message, an email message, and the like.

At step 238, the dynamic resource management computing platform 103 may establish a connection to second user device 107. For example, the dynamic resource management computing platform 103 may establish a seventh wireless data connection to the second user device 107 to link the dynamic resource management computing platform 103 to the second user device 107. Actions described at step 238 may be similar to those described above with regard to step 233.

At step 239, the dynamic resource management computing platform 103 may generate one or more hand off commands directing the second user device, corresponding to a second operator, to cause display of an operator interface corresponding to the second operator. For example, after determining that the second operator is responsible for resolution of a second error code in the error information, the dynamic resource management computing platform 103 may generate one or more hand off commands directing the second user device 107, corresponding to the second operator, to notify the second operator of the second error code by generating the operator interface corresponding to the second operator. Actions performed at step 239 may be similar to those described above with regard to step 235.

At step 240, the dynamic resource management computing platform 103 may send, to the second user device, the one or more hand off commands generated at step 239. For example, the dynamic resource management computing platform 103 may send, while the seventh wireless data connection is established, via the communication interface 116, and along with the operator interface information, the one or more hand off commands directing the second user device 107 to notify the second operator of the second error code by generating the operator interface corresponding to the second operator. Actions performed at step 240 may be similar to those described above with regard to step 235.

Referring to FIG. 2K, at step 241, the second user device 107 may receive the operator interface information and the one or more hand off commands from the dynamic resource management computing platform 103. For example, the second user device 107 may receive, while the seventh wireless data connection is established, the one or more hand off commands directing the second user device 107 to notify the second operator of the second error code by generating the operator interface corresponding to the second operator. Actions performed at step 241 may be similar to those described above with regard to step 236.

At step 242, the second user device 107 may generate and cause display of a second operator notification interface (e.g., based on the operator interface information and the one or more hand off commands directing the second user device 107 to notify the second operator of the second error code by generating the second operator interface), different than the first operator notification interface. For example, the second user device 107 may display and/or otherwise present a graphical user interface similar to graphical user interface 305, which is illustrated in FIG. 3 and is described above. In some instances, steps 238-242 may be performed simultaneously with steps 233-237. For example, the dynamic resource management computing platform 103 may inform multiple operators of their responsibilities to resolve error codes at the same time. In other instances, steps 233-237 may be performed after completion of steps 238-242. For example, the dynamic resource management computing platform 103 may inform a first operator that there is a need to resolve a first error code. Once the dynamic resource management computing platform 103 receives an indication that the first error code has been resolved, the dynamic resource management computing platform 103 may notify a second operator of the need to resolve a subsequent error code. Actions performed at step 242 may be similar to those described above with regard to step 237.

At step 243, the dynamic resource management computing platform 103 may generate an error correction hub. For example, based on the error information and using at least one or more machine learning algorithms and at least one or more machine learning datasets corresponding to the error occurrences, the dynamic resource management computing platform 103 may generate the error correction hub. For example, the error correction hub may correspond to a graphical user interface similar to graphical user interface 405, which is illustrated in FIG. 4. As seen in FIG. 4, graphical user interface 405 may include information associated with resolution of the error indicated in the error information, such as an error type, an operator tasked with resolution of the error, a method for resolving the error, an estimated resolution time, and the like. It should be understood that other information associated with resolution of the error may be displayed via graphical user interface 405. In some examples, if multiple operators are associated with resolution of the error, the dynamic resource management computing platform 103 may modify the graphical user interface 405 to remove information associated with resolution of a first error code, and to cause display of information associated with resolution of a second error code once the first error code has been resolved. In some examples, the dynamic resource management computing platform 103 may include information associated with resolution of multiple error codes at the same time in the graphical user interface 405. In some instances, the information displayed on the graphical user interface 405 may be determined using one or more machine learning algorithms and one or more machine learning datasets.

At step 244, the dynamic resource management computing platform 103 may establish a connection to client management computing platform 108. For example, the dynamic resource management computing platform 103 may establish an eighth wireless data connection to the client management computing platform 108 to link the dynamic resource management computing platform 103 to the client management computing platform 108.

Figure 2L:
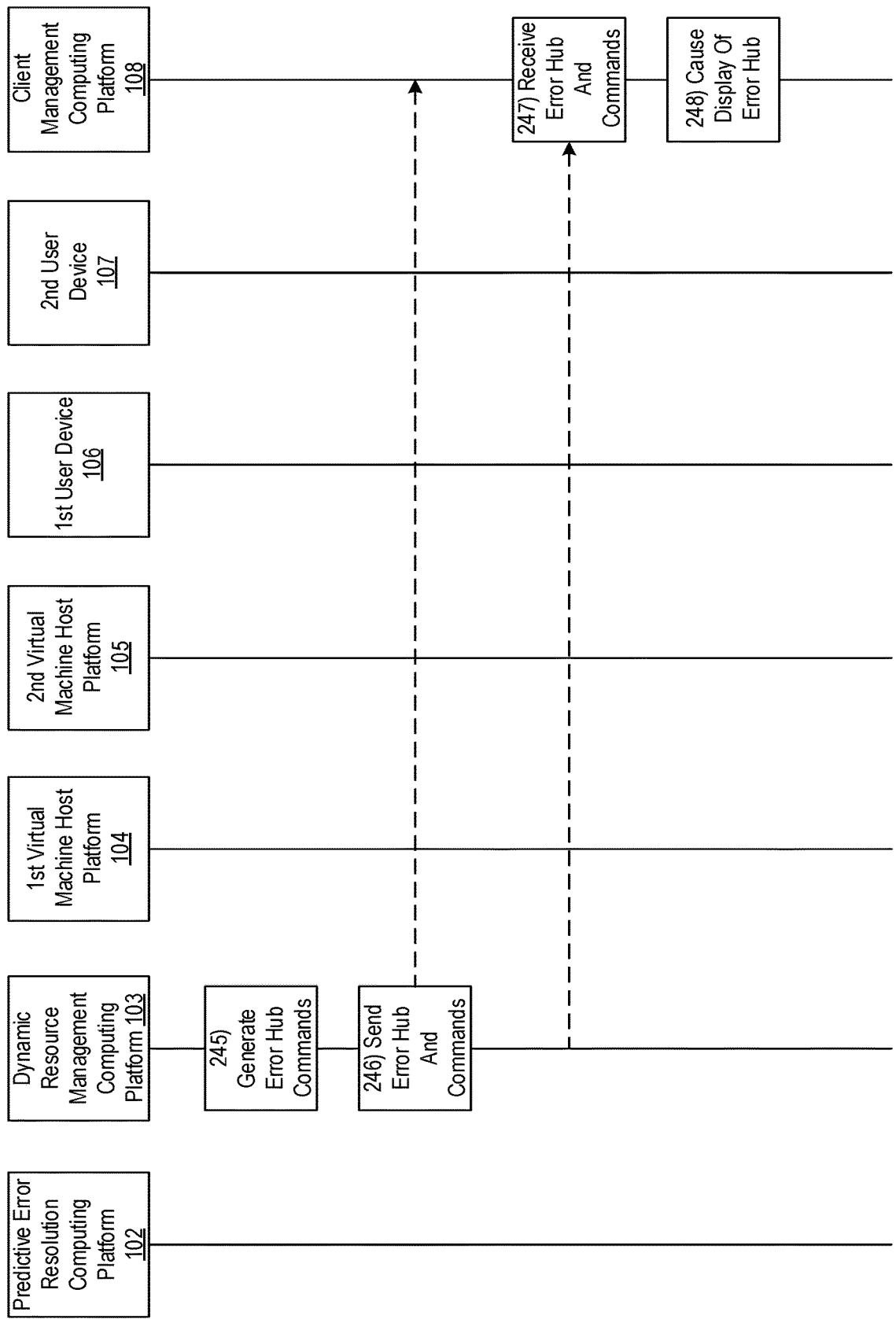

Referring to FIG. 2L, at step 245, the dynamic resource management computing platform 103 may generate one or more commands directing the client management computing platform 108 to cause display of the error correction hub generated at step 245.

At step 246, the dynamic resource management computing platform 103 may send, to the client management computing platform 108, the one or more commands generated at step 245. For example, the dynamic resource management computing platform 103 may send, while the eighth wireless data connection is established, via the communication interface 116, and along with the error correction hub, the one or more commands directing the client management computing platform 108 to cause display of the error correction hub.

At step 247, the client management computing platform 108 may receive the error correction hub and the one or more commands from the dynamic resource management computing platform 103. For example, the client management computing platform 108 may receive, while the eighth wireless data connection is established, the one or more commands directing the client management computing platform 108 to cause display of the error correction hub.

At step 248, the client management computing platform 108 may cause display of the error correction hub (e.g., based on information and the commands from the dynamic resource management computing platform 103 directing the client management computing platform 108 to cause display of the error correction hub). For example, the client management computing platform 108 may display and/or otherwise present a graphical user interface similar to graphical user interface 405, which is illustrated in FIG. 4 and is described above.

Subsequently, the example event sequence may end, and predictive error resolution computing platform 102 and dynamic resource management computing platform 103 may continue to predict errors and to cause system configuration updates in a similar manner as discussed above (e.g., by comparing error log files, predicting error outcomes, and causing system configuration updates to avoid the error outcomes) to implement predictive error resolution and dynamic resource management. By operating in this way, predictive error resolution computing platform 102 and dynamic resource management computing platform 103 may improve error prediction, error resolution, and resource allocation for virtual machines and/or other systems and devices included in computing environment 100. By performing error prediction based on error log files from multiple virtual host machines, predictive error resolution computing platform 102 may more accurately forecast potential errors and may allow dynamic resource management computing platform 103 to more effectively manage system configuration of the virtual machines to avoid error outcomes. If an error does occur, the dynamic resource management computing platform 103 may facilitate the resolution process by distributing different error codes included in the error information to user devices corresponding to operators responsible for resolution of each of the different error codes. This may increase the efficiency of error resolution.

Although FIG. 2 depicts two virtual machine host platforms, two user devices, and a single client management computing platform, it should be understood that this is merely exemplary and that any number of virtual machine host platforms, user devices, and client management computing platforms may be deployed in the system described.

Figure 5:
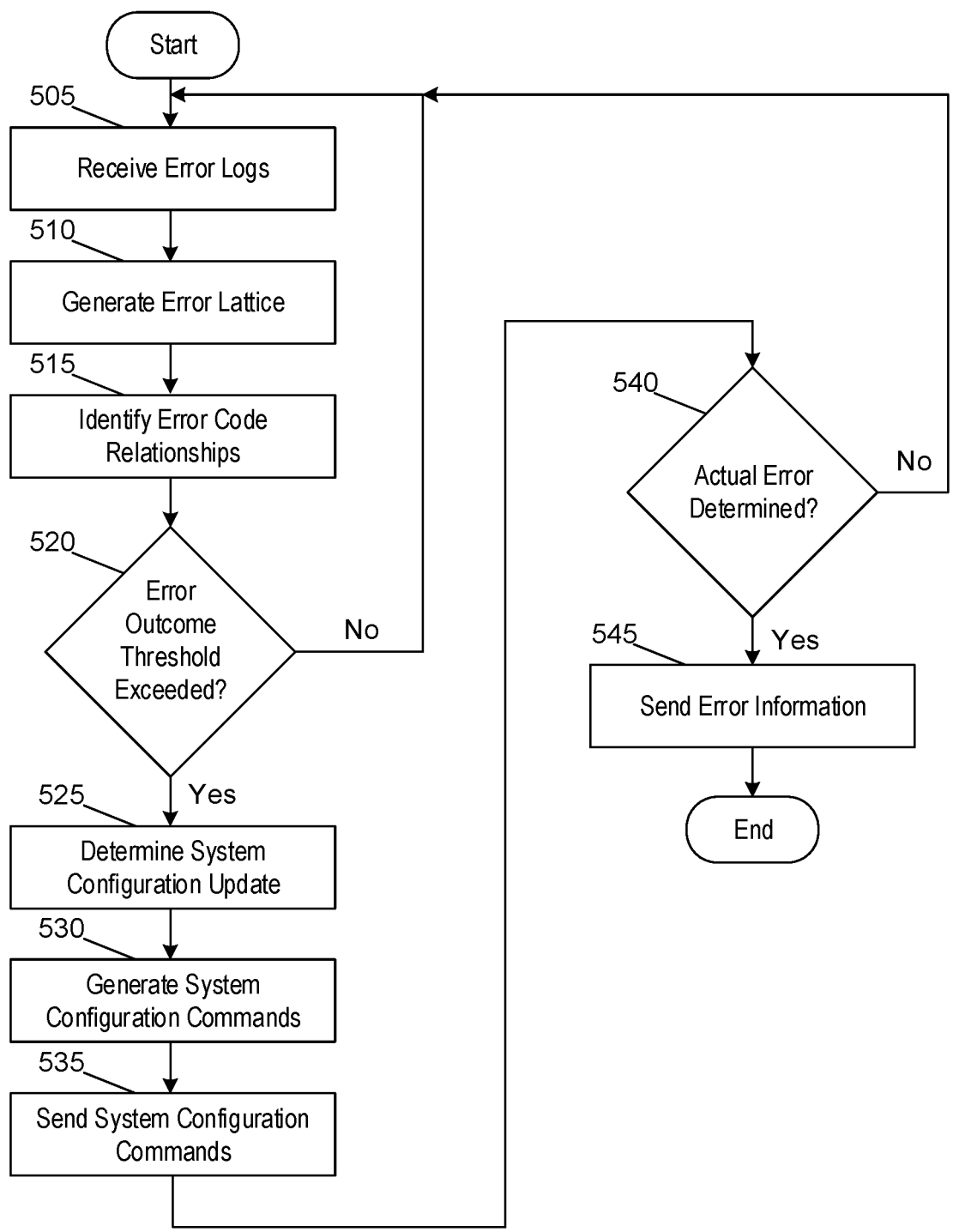
FIGS. 5 and 6 depict an illustrative method for deploying an enhanced processing system that utilizes improved error prediction and dynamic system configuration control techniques in accordance with one or more example embodiments.

FIG. 5 depicts an illustrative method for deploying a predictive error resolution processing system that uses improved error prediction and mitigation techniques in accordance with one or more example embodiments. Referring to FIG. 5, at step 505, a computing platform having at least one processor, a communication interface, and memory may receive, from one or more virtual machine host platforms, one or more error log files. At step 510, the computing platform may generate, based on the error log files, an error lattice. At step 515, after generating the error lattice, the computing platform may identify relationships between error codes in the error lattice. At step 520, the computing platform may determine whether a predetermined error outcome threshold has been exceeded. If the predetermined error outcome threshold has not been exceeded, the computing platform may return to step 505 to receive additional error log files. If the predetermined error outcome threshold has been exceeded, the computing platform may proceed to step 525.

At step 525, the computing platform may determine a system configuration update to be applied to the one or more virtual host platforms. At step 530, the computing platform may generate one or more system configuration commands directing a dynamic resource management computing platform to distribute relevant portions of the system configuration update to each of the one or more virtual machine host platforms. At step 535, the computing platform may send, to the dynamic resource management computing platform, the one or more system configuration commands directing the dynamic resource management computing platform to distribute relevant portions of the system configuration update to each of the one or more virtual host platforms. In some instances, by sending the one or more system configuration commands directing the dynamic resource management computing platform to distribute relevant portions of the system configuration update to each of the one or more virtual host platforms, the computing platform may cause the one or more virtual machine host platforms to implement the system configuration update.

At step 540, the computing platform may determine whether an actual error has been determined. If the computing platform determines that an actual error has not occurred, the computing platform may return to step 505 to receive additional error logs. If the computing platform does determine an actual error, the computing platform may proceed to step 545. At step 545, in response to determining an actual error, the computing platform may send, to the dynamic resource management computing platform, error information.

Figure 6:
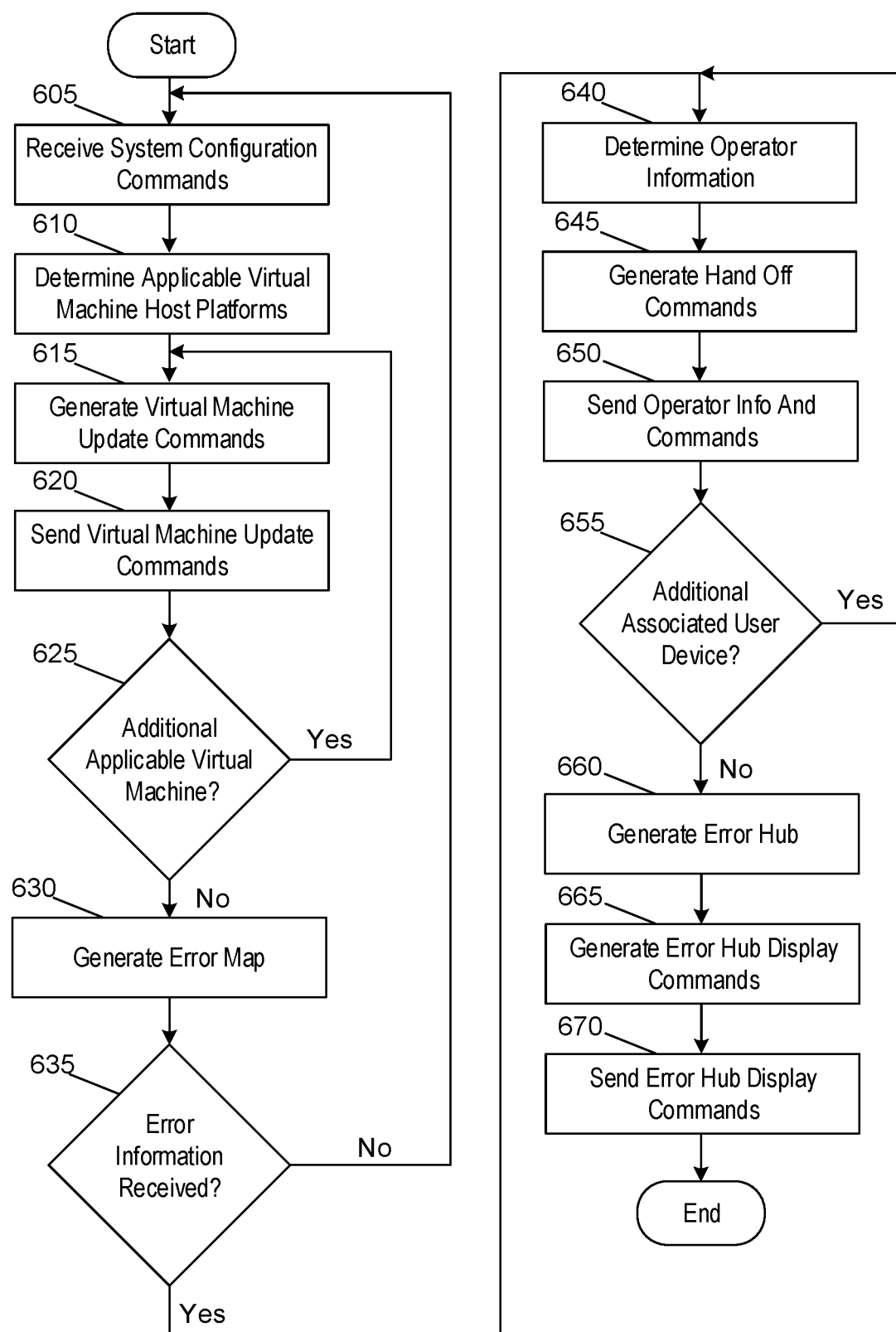

FIG. 6 depicts an illustrative method for deploying a dynamic system configuration control processing system that uses improved techniques to dynamically manage computing resources in accordance with one or more example embodiments. Referring to FIG. 6, at step 605, a computing platform having at least one processor, a communication interface, and memory may receive, from a predictive error resolution computing platform 102, one or more system configuration commands directing the computing platform to distribute relevant portions of a system configuration update. At step 610, in response to the one or more system configuration commands directing the computing platform to distribute relevant portions of the system configuration update, the computing platform may identify one or more virtual machine host platforms to which the system configuration update is applicable. At step 615, the computing platform may generate virtual machine update commands directing each of the one or more virtual machine host platforms to which the system configuration update is applicable to perform system, updates based on the system configuration update. At step 620, after generating the virtual machine update commands, the computing platform may send, to each of the one or more virtual machine host platforms to which the system configuration update is applicable, the virtual machine update commands.

At step 625, the computing platform may determine whether additional virtual machine host platforms should be directed to update a system configuration. If the computing platform determines that additional virtual machines should be directed to update a system configuration, the computing platform may return to step 615 to generate additional virtual machine update commands. If the computing platform determines that additional virtual machines should not be directed to perform a system configuration update, the computing platform may proceed to step 630. At step 630, the computing platform may generate an error map showing correlations between error codes and operators responsible for resolution of each of the error codes.

At step 635, the computing platform may determine whether error information was received, indicating an actual error. If error information was not received, the computing platform may return to step 605. If the computing platform did receive error information, the computing platform may proceed to step 640. At step 640, the computing platform may determine, based on the error map and the error information, operator interface information indicating one or more operators responsible for resolution of each error code included in the error information. At step 645, the computing platform may generate one or more hand off commands directing one or more user devices to cause display of an operator interface corresponding to each of the one or more operators responsible for resolution of each error code included in the error information. At step 650, after generating the one or more hand of commands, the computing platform may send, to the one or more user devices, the one or more hand off commands and the operator interface information.

At step 655, the computing platform may determine whether operator interface information should be sent to an additional user device corresponding to the one or more operators responsible for resolution of each error code included in the error information. If the computing platform determines that operator interface information should be sent to an additional user device, the computing platform may return to step 640. If the computing platform determines that operator interface information should not be sent to an additional user device, the computing platform may proceed to step 660. At step 660, the computing platform may generate an error correction hub that presents information corresponding to resolution of the one or more error codes included in the error information. At step 665, the computing platform may generate one or more error correction hub display commands directing a client management computing platform to cause display of the error correction hub. At step 670, after generating the error correction hub display commands, the computing platform may send, along with the error correction hub and to the client management computing platform, the one or more error correction hub display commands.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, from a predictive error resolution computing platform, one or more commands directing the computing platform to distribute relevant portions of a system configuration update;
   identify one or more virtual machine host platforms to which the system configuration update is applicable;
   generate, based on the system configuration update, one or more commands directing of each the one or more virtual machine host platforms to which the system configuration update is applicable to perform system updates based on the system configuration update;
   receive, from the one or more virtual machine host platforms, a configuration update confirmation notification;
   generate, based on at least one machine learning algorithm and at least one dataset, an error map identifying correlations between error codes and a respective operator for each error code;
receive, from the predictive error resolution computing platform, error information comprising a plurality of error codes corresponding to error occurrences;
determine, based on the error map, operator interface information indicating one or more operators associated with resolution of each of the plurality of error codes corresponding to the error occurrences;
generate one or more hand off commands for one or more user devices, each hand off command of the one or more hand off commands being associated with an operator of the one or more operators, to cause display of an operator interface associated with the respective operator;
send, to the one or more user devices and along with the one or more hand off commands, the operator interface information;
generate, based on the error occurrences and using at least one additional machine learning algorithm and at least one additional dataset, an error correction hub;
generate one or more commands directing a client management computing platform to cause display of the error correction hub; and
send, along with the one or more commands directing the client management computing platform to cause display of the error correction hub, the error correction hub.

2. The computing platform of claim 1, wherein the memory stores additional computer-readable instructions that, when executed by the at least one processor, further cause the computing platform to:
establish, with the predictive error resolution computing platform, each of the one or more virtual machine host platforms, each of the one or more user devices, and the client management computing platform, wireless data connections.

3. The computing platform of claim 2, wherein the memory stores additional computer-readable instructions that, when executed by the at least one processor, further cause the computing platform to:
send, using the communication interface, using the wireless data connections, and to the one or more virtual machine host platforms to which the system configuration update is applicable, the one or more commands directing each of the one or more virtual machine host platforms to which the system configuration update is applicable to perform system updates based on the system configuration update.

4. The computing platform of claim 1, wherein generating the error correction hub comprises generating a user interface displaying one or more of: the error occurrences, the one or more operators associated with resolution of each of the plurality of error codes corresponding to the error occurrences, a resolution method associated with resolution of each of the plurality of error codes corresponding to the error occurrences, and an estimated resolution time for conducting the resolution method associated with resolution of each of the plurality of error codes corresponding to the error occurrences.

5. The computing platform of claim 4, wherein the memory stores additional computer-readable instructions that, when executed by the at least one processor, further cause the computing platform to:
determine, based on one or more machine learning algorithms and one or more machine learning datasets, the resolution method associated with resolution of each of the plurality of error codes corresponding to the error occurrences and the estimated resolution time for conducting the resolution method associated with resolution of each of the plurality of error codes corresponding to the error occurrences.

6. The computing platform of claim 1, wherein the memory stores additional computer-readable instructions that, when executed by the at least one processor, further cause the computing platform to:
determine that the error map does not identify the error information comprising the plurality of error codes corresponding to error occurrences; and
update, using the plurality of error codes corresponding to error occurrences and after determining operators corresponding to each of the plurality of error codes corresponding to error occurrences, the error map to identify the plurality of error codes and the operators.

7. The computing platform of claim 1, wherein sending, to the one or more user devices and along with the one or more commands, the operator interface information comprises:
sending, to a second user device of the one or more user devices and after receiving an error code resolution indication from a first user device of the one or more user devices, the operator interface information.

8. A method comprising:
at a computing platform comprising at least one processor, a communication interface, and memory:
receiving, from a predictive error resolution computing platform, one or more commands directing the computing platform to distribute relevant portions of a system configuration update;
identifying one or more virtual machine host platforms to which the system configuration update is applicable;
generating, based on the system configuration update, one or more commands directing each of the one or more virtual machine host platforms to which the system configuration update is applicable to perform system updates based on the system configuration update;
receiving, from the one or more virtual machine host platforms, a configuration update confirmation notification;
generating, based on at least one machine learning algorithm and at least one dataset, an error map identifying correlations between error codes and a respective operator for each error code;
receiving, from the predictive error resolution computing platform, error information comprising a plurality of error codes corresponding to error occurrences;
determining, based on the error map, operator interface information indicating one or more operators associated with resolution of each of the plurality of error codes corresponding to the error occurrences;
generating one or more hand off commands for one or more user devices, each hand off command of the one or more hand off commands being associated with an operator of the one or more operators, to cause display of an operator interface associated with the respective operator;
sending, to the one or more user devices and along with the one or more hand off commands, the operator interface information;

generating, based on the error occurrences and using at least one additional machine learning algorithm and at least one additional dataset, an error correction hub;

generating one or more commands directing a client management computing platform to cause display of the error correction hub; and sending, along with the one or more commands directing the client management computing platform to cause display of the error correction hub, the error correction hub.

9. The method of claim 8, further comprising:
establishing, with the predictive error resolution computing platform, each of the one or more virtual machine host platforms, each of the one or more user devices, and the client management computing platform, wireless data connections.

10. The method of claim 9, further comprising:
sending, using the communication interface, using the wireless data connections, and to the one or more virtual machine host platforms to which the system configuration update is applicable, the one or more commands directing each of the one or more virtual machine host platforms to which the system configuration update is applicable to perform system updates based on the system configuration update.

11. The method of claim 8, wherein generating the error correction hub comprises generating a user interface displaying one or more of: the error occurrences, the one or more operators associated with resolution of each of the plurality of error codes corresponding to the error occurrences, a resolution method associated with resolution of each of the plurality of error codes corresponding to the error occurrences, and an estimated resolution time for conducting the resolution method associated with resolution of each of the plurality of error codes corresponding to the error occurrences.

12. The method of claim 11, further comprising:
determining, based on one or more machine learning algorithms and one or more machine learning datasets, the resolution method associated with resolution of each of the plurality of error codes corresponding to the error occurrences and the estimated resolution time for conducting the resolution method associated with resolution of each of the plurality of error codes corresponding to the error occurrences.

13. The method of claim 8, further comprising:
determining that the error map does not identify the error information comprising the plurality of error codes corresponding to error occurrences; and
updating, using the plurality of error codes corresponding to error occurrences and after determining operators corresponding to each of the plurality of error codes corresponding to error occurrences, the error map to identify the plurality of error codes and the operators.

14. The method of claim 8, wherein sending, to the one or more user devices and along with the one or more commands, the operator interface information comprises:
sending, to a second user device of the one or more user devices and after receiving an error code resolution indication from a first user device of the one or more user devices, the operator interface information.

15. One or more non-transitory computer-readable media storing instructions that, when executed by a computing platform comprising at least one processor, a communication interface, and memory, cause the computing platform to:

receive, from a predictive error resolution computing platform, one or more commands directing the computing platform to distribute relevant portions of a system configuration update;

identify one or more virtual machine host platforms to which the system configuration update is applicable;

generate, based on the system configuration update, one or more commands directing each of the one or more virtual machine host platforms to which the system configuration update is applicable to perform system updates based on the system configuration update;

receive, from the one or more virtual machine host platforms, a configuration update confirmation notification;

generate, based on at least one machine learning algorithm and at least one dataset, an error map identifying correlations between error codes and a respective operator for each error code;

receive, from the predictive error resolution computing platform, error information comprising a plurality of error codes corresponding to error occurrences;

determine, based on the error map, operator interface information indicating one or more operators associated with resolution of each of the plurality of error codes corresponding to the error occurrences;

generate one or more hand off commands for one or more user devices, each hand off command of the one or more hand off commands being associated with an operator of the one or more operators, to cause display of an operator interface associated with the respective operator;

send, to the one or more user devices and along with the one or more hand off commands, the operator interface information;

generate, based on the error occurrences and using at least one additional machine learning algorithm and at least one additional dataset, an error correction hub;

generate one or more commands directing a client management computing platform to cause display of the error correction hub; and send, along with the one or more commands directing the client management computing platform to cause display of the error correction hub, the error correction hub.

16. The one or more non-transitory computer-readable media of claim 15, wherein the memory stores additional instructions, that when executed by the at least one processor, cause the at least one processor to:
establish, with the predictive error resolution computing platform, each of the one or more virtual machine host platforms, each of the one or more user devices, and the client management computing platform, wireless data connections.

17. The one or more non-transitory computer-readable media of claim 16, wherein the memory stores additional instructions, that when executed by the at least one processor, cause the at least one processor to:
send, using the communication interface, using the wireless data connections, and to the one or more virtual machine host platforms to which the system configuration update is applicable, the one or more commands directing each of the one or more virtual machine host platforms to which the system configuration update is applicable to perform system updates based on the system configuration update.

18. The one or more non-transitory computer-readable media of claim 15, wherein generating the error correction hub comprises generating a user interface displaying one or more of: the error occurrences, the one or more operators associated with resolution of each of the plurality of error codes corresponding to the error occurrences, a resolution method associated with resolution of each of the plurality of error codes corresponding to the error occurrences, and an estimated resolution time for conducting the resolution method associated with resolution of each of the plurality of error codes corresponding to the error occurrences.

19. The one or more non-transitory computer-readable media of claim 18, wherein the memory stores additional instructions, that when executed by the at least one processor, cause the at least one processor to:
   determine, based on one or more machine learning algorithms and one or more machine learning datasets, the resolution method associated with resolution of each of the plurality of error codes corresponding to the error occurrences and the estimated resolution time for conducting the resolution method associated with resolution of each of the plurality of error codes corresponding to the error occurrences.

20. The one or more non-transitory computer-readable media of claim 15, wherein the memory stores additional instructions, that when executed by the at least one processor, cause the at least one processor to:
   determine that the error map does not identify the error information comprising the plurality of error codes corresponding to error occurrences; and
   update, using the plurality of error codes corresponding to error occurrences and after determining operators corresponding to each of the plurality of error codes corresponding to error occurrences, the error map to identify the plurality of error codes and the operators.

* * * * *